United States Patent [19]
Maeda

[11] Patent Number: 5,579,111
[45] Date of Patent: Nov. 26, 1996

[54] ENCODING APPARATUS FOR MAKING MEASUREMENTS OF TWO-DIMENSIONAL DISPLACEMENT OF AN OBJECT

[75] Inventor: Hideo Maeda, Yokohama, Japan

[73] Assignee: Ricoh Company, Ltd., Tokyo, Japan

[21] Appl. No.: 552,167

[22] Filed: Nov. 2, 1995

Related U.S. Application Data

[63] Continuation of Ser. No. 215,566, Mar. 22, 1994, abandoned.

[30] Foreign Application Priority Data

Mar. 23, 1993 [JP] Japan .................................. 5-087927
Mar. 16, 1994 [JP] Japan .................................. 6-072654

[51] Int. Cl.⁶ .................................................. G01B 9/02
[52] U.S. Cl. .................... 356/356; 356/363; 250/237 G
[58] Field of Search .................................. 356/356, 345, 356/363; 250/237 G

[56] References Cited

U.S. PATENT DOCUMENTS

| | | | |
|---|---|---|---|
| 3,756,723 | 9/1973 | Hock | 250/237 G |
| 4,676,645 | 6/1987 | Taniguchi et al. | 250/237 G |
| 4,776,701 | 10/1988 | Pettigrew | 356/356 |
| 5,000,542 | 3/1991 | Nishimura et al. | 356/356 |
| 5,101,102 | 3/1992 | Nishimura et al. | 356/356 |
| 5,104,225 | 4/1992 | Masreliez | 356/356 |
| 5,204,524 | 4/1993 | Ichikawa et al. | 250/237 G |
| 5,206,704 | 4/1993 | Huber et al. | 356/356 |
| 5,214,280 | 5/1993 | Rieder et al. | 250/237 G |
| 5,258,861 | 11/1993 | Tsuchiya | 356/356 |
| 5,333,048 | 7/1994 | Michel et al. | 356/356 |
| 5,369,486 | 11/1994 | Matsumoto et al. | 356/363 |
| 5,390,022 | 2/1995 | Ishizuka et al. | 356/356 |
| 5,404,220 | 4/1995 | Takeuchi et al. | 356/356 |

FOREIGN PATENT DOCUMENTS 1392357  4/1988  Russian Federation ............... 356/356

*Primary Examiner*—Samuel A. Turner
*Assistant Examiner*—Robert Kim
*Attorney, Agent, or Firm*—Oblon, Spivak, McClelland, Maier & Neustadt, P.C.

[57] ABSTRACT

An encoding apparatus includes: a light source; a diffraction grating, including a number of fine grating portions orthogonally arranged in columns and rows in a diffraction grating surface, for producing first diffracted light rays and second diffracted light rays in accordance with light emitted from the light source, each of the first diffracted light rays having a direction cosine on a first plane, and each of the second diffracted light rays having a direction cosine on a second plane; an interference unit for producing a first interference light ray by subjecting two diffracted light rays of the first diffracted light rays to interference, and for producing a second interference light ray by subjecting two diffracted light rays of the second diffracted light rays to interference; a first detection unit for detecting a phase change of the first interference light ray when an object is moved relative to the light source; and a second detection unit for detecting a phase change of the second interference light ray when the object is moved relative to the light source.

22 Claims, 30 Drawing Sheets

FIG. 29
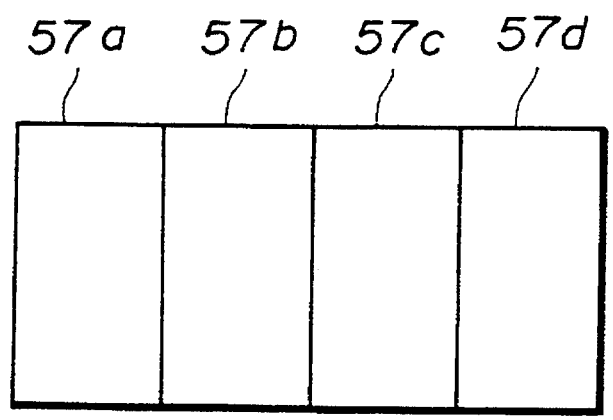
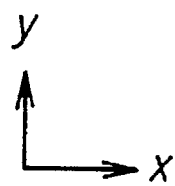

ENCODING APPARATUS FOR MAKING MEASUREMENTS OF TWO-DIMENSIONAL DISPLACEMENT OF AN OBJECT

This application is a continuation of application Ser. No. 08/215,566, filed on Mar. 22, 1994, now abandoned.

BACKGROUND OF THE INVENTION

The present invention relates to an encoding apparatus for making accurate measurements of a movement of a measuring object within a copying machine or precision measuring equipment.

A known encoding apparatus which can make measurements of a linear movement of a measuring object with the currently highest resolution is shown in FIG. 32. In the encoding apparatus in FIG. 32, the light emitted from a helium-neon laser light source 61 passes through a half-mirror 62 and it enters a rotary encoder disk 63 in a direction perpendicular to the surface of the rotary encoder disk 63. The rotary encoder disk 63 includes a diffraction grating A having a number of very fine radial grating slits. The grating slits are formed in the surface of the rotary encoder disk 63 so as to radially extend from the center of the rotary encoder disk 63. The rotary encoder disk 63 has a 15-mm outside diameter, and the diffraction grating A has 30,000 grating slits and a 15.7-μm grating pitch at the outside periphery thereof.

As the light emitted from the light source 61 enters the rotary encoder disk 63 in the direction perpendicular to the surface of the diffraction grating A, (−1)th-order and (+1)th-order diffracted light rays are produced by the diffraction grating A and they are directed to mirrors 64 and 65 through two optical paths. A portion of the light from the light source 61 is reflected from the half-mirror 62 and the reflected light passes through a pinhole 67 and it enters a photodetector 68.

At the same time, the (±1)th-order diffracted light rays are reflected from the mirrors 64 and 65, and they enter the diffraction grating 63 through the optical paths. The reflected light rays (the (±1)th-order diffracted light rays) enter the diffraction grating A at the same position. The diffracted light rays are produced by the diffraction grating A in the same manner, and they enter the half-mirror 62 in the opposite direction through the optical path that is the same as the original optical path. Thus, the light rays emitted from the light source 61 and the light rays reflected from the diffraction grating 63 interfere with each other, and the interference light ray is reflected from the half-mirror 62. The interference light ray passes through the pinhole 67, and it enters the photodetector 68. Thus, the intensity of the interference light can be detected by the photodetector 68.

As the rotary encoder disk 63 rotates in a direction indicated by the arrow in FIG. 32, the diffraction grating A is moved relative to the light source. By the rotation of the diffraction grating A, the intensity of the interference light detected by the photodetector 68 is changed in response to that movement.

More specifically, in accordance with one grating pitch of the movement of the diffraction grating A in the rotating direction, the intensity of the interference light detected by the photodetector 68 is changed as much as four periods of the interference light. When the rotary encoder disk 63 is rotated by one complete revolution (equivalent to the amount of 30,000 grating slits on the rotary encoder disk 63), the photodetector 68 outputs 120,000 sine signal pulses, that is, the sine signals with a 0.052-mrad period can be obtained from the photodetector 68. Therefore, the encoding apparatus in FIG. 32 can make measurements of the number of revolutions of a measuring object or measurements of the rotation speed of the measuring object with high resolution.

However, the known encoding apparatus can provide only measurements of a linear (or one-directional) displacement of a measuring object. It is impossible for the known encoding apparatus to make measurements of a two-dimensional displacement of a measuring object.

SUMMARY OF THE INVENTION

Accordingly, it is a general object of the present invention to provide a novel and useful encoding apparatus in which the above described problems are eliminated.

Another, more specific object of the present invention is to provide an encoding apparatus which can provide accurate measurements of a two-dimensional displacement of an object with high resolution.

Still another object of the present invention is to provide an encoding apparatus which can provide accurate measurements of a two-dimensional displacement of an object by means of a simple structure.

A further object of the present invention is to provide an encoding apparatus which can provide accurate measurements of a two-dimensional displacement of an object without lowering the sensitivity when the wavelength of light emitted from the light source varies.

The above mentioned objects of the present invention are achieved by an encoding apparatus which includes: a light source; a diffraction grating, including a number of fine grating recesses orthogonally arranged in columns and rows in a diffraction grating surface, for producing first diffracted light rays and second diffracted light rays in accordance with light emitted from the light source, each of the first diffracted light rays having a direction cosine on a first plane, and each of the second diffracted light rays having a direction cosine on a second plane; an interference unit for producing a first interference light ray by subjecting two diffracted light rays of the first diffracted light rays supplied from the diffraction grating, to light interference, and for producing a second interference light ray by subjecting two diffracted light rays of the second diffracted light rays supplied from the diffraction grating, to light interference; a first detection unit for detecting a phase change of the first interference light ray supplied from the interference unit when an object fixed to the diffraction grating is moved relative to the light source; and a second detection unit for detecting a phase change of the second interference light ray supplied from the interference unit when the object is moved relative to the light source.

The above mentioned objects of the present invention are also achieved by an encoding apparatus which includes: a light source; a plurality of diffraction grating units each of which includes a number of fine grating recesses orthogonally arranged in columns and rows in a diffraction grating surface and having grating pitches in two mutually orthogonal directions within the diffraction grating surface, the plurality of diffraction grating units being arranged in parallel to each other, the plurality of diffraction grating units including at least a first diffraction grating unit for producing first-occurrence, n-th order diffracted light rays of four diffraction directions in response to light emitted from the light source, and a second diffraction grating unit for producing second-occurrence, m-th order diffracted light rays of four diffraction directions in response to the first-occurrence, n-th order diffracted light rays from the first diffraction grating unit; a reflection unit for reflecting two diffracted light rays of the second-occurrence, m-th order diffracted light rays, supplied from the plurality of diffraction grating units, back to at least the first diffraction grating unit, subjecting the two reflected light rays to light diffraction again by the first diffraction grating unit to produce two sets of final-occurrence diffracted light rays with respect to the two mutually orthogonal directions, and for producing first and second interference light rays by interference between one of the two sets of final-occurrence diffracted light rays from the first diffraction grating unit and by interference between the other set of final-occurrence diffracted light rays; and a detection unit for detecting a phase change of each of the first and second interference light rays, supplied from the first diffraction grating unit by making use of the reflection unit, when an object fixed to at least one of the plurality of diffraction grating units is moved relative to the light source.

According to the present invention, it is possible to make accurate measurements of a two-dimensional displacement of an object with high resolution. In addition, the encoding apparatus according to the present invention can make accurate measurements of a two-dimensional displacement of an object by means of a simple structure. In addition, the encoding apparatus according to the present invention can make accurate measurements of a two-dimensional displacement of an object without lowering the sensitivity when the wavelength of light emitted from the light source varies.

BRIEF DESCRIPTION OF THE DRAWINGS

The above and other objects, features and advantages of the present invention will be more apparent from the following detailed description when read in conjunction with the accompanying drawings in which:

FIG. 29 is a diagram showing a different modification of the photodetectors of the encoding apparatus in FIG. 22;

DESCRIPTION OF THE PREFERRED EMBODIMENTS

A description will now be given, with reference to FIGS. 1 through 6, of the encoding apparatus according to the present invention.

Figure 1:
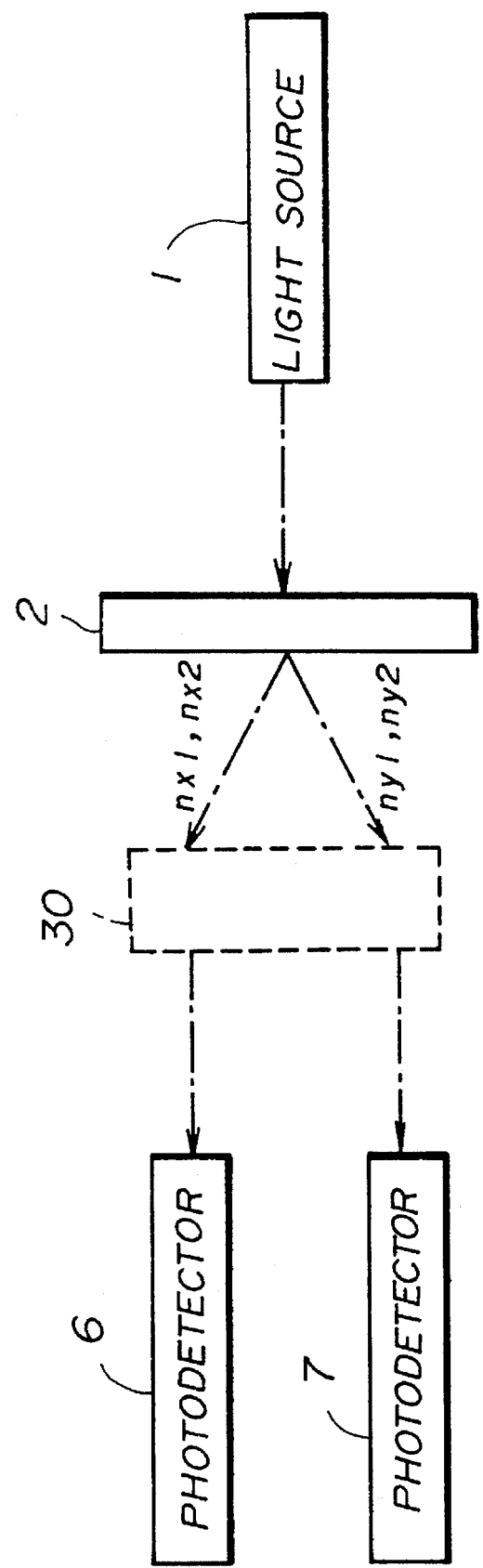
FIG. 1 is a diagram showing an encoding apparatus according to the present invention.

The encoding apparatus shown in FIG. 1 includes a helium-neon laser light source 1 for emitting laser light, a diffraction grating 2 of a cross grating type, an interference unit 30, and photodetectors 6 and 7. In accordance with the incident light from the light source 1 having entered the diffraction grating 2 in a direction perpendicular to the diffraction grating surface, the diffraction grating 2 produces first diffracted light rays having a direction cosine on a first plane and second diffracted light rays having a direction cosine on a second plane perpendicular to the first plane.

Figure 2:
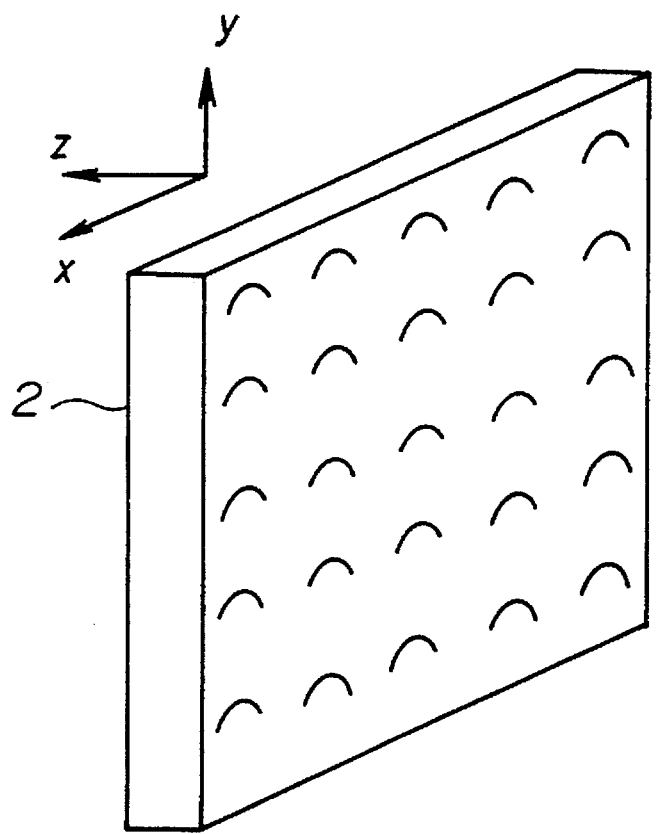
FIG. 2 is a perspective view showing a diffraction grating of the encoding apparatus shown in FIG. 1.
Figure 3:
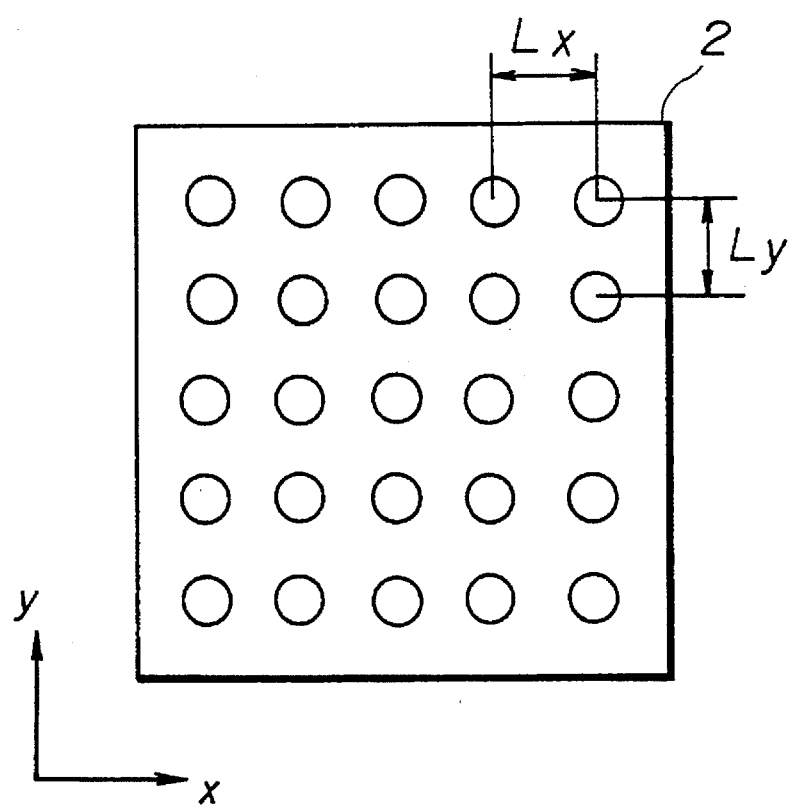
FIG. 3 is a plan view showing the diffraction grating in FIG. 2.

FIGS. 2 and 3 show an example of the diffraction grating 2 used by the encoding apparatus in FIG. 1. In FIGS. 2 and 3, the diffraction grating 2 is placed in an x–y–z orthogonal coordinate system. The diffraction grating 2 is of a cross grating type including a large number of very fine grating recesses orthogonally arranged in columns and rows (within the x–y plane) in the diffraction grating surface. The grating recesses of the diffraction grating 2 have an x-directional pitch Lx and a y-directional pitch Ly as indicated in FIG. 3. The x-directional pitch Lx is the distance between the centers of two adjacent recesses of the grating recesses in the x direction, and the y-directional pitch Ly is the distance between the centers of two adjacent recesses of the grating recesses in the y direction.

In order to increase the diffraction effects, the cross grating type diffraction grating in FIG. 2 is made into a relief diffraction grating including a number of fine grating recesses orthogonally arranged in columns and rows (within the x–y plane) in the diffraction grating surface. This relief diffraction grating can be produced by making use of a two-beam interference method, a mask exposure method, or an electron beam method.

Figure 4:
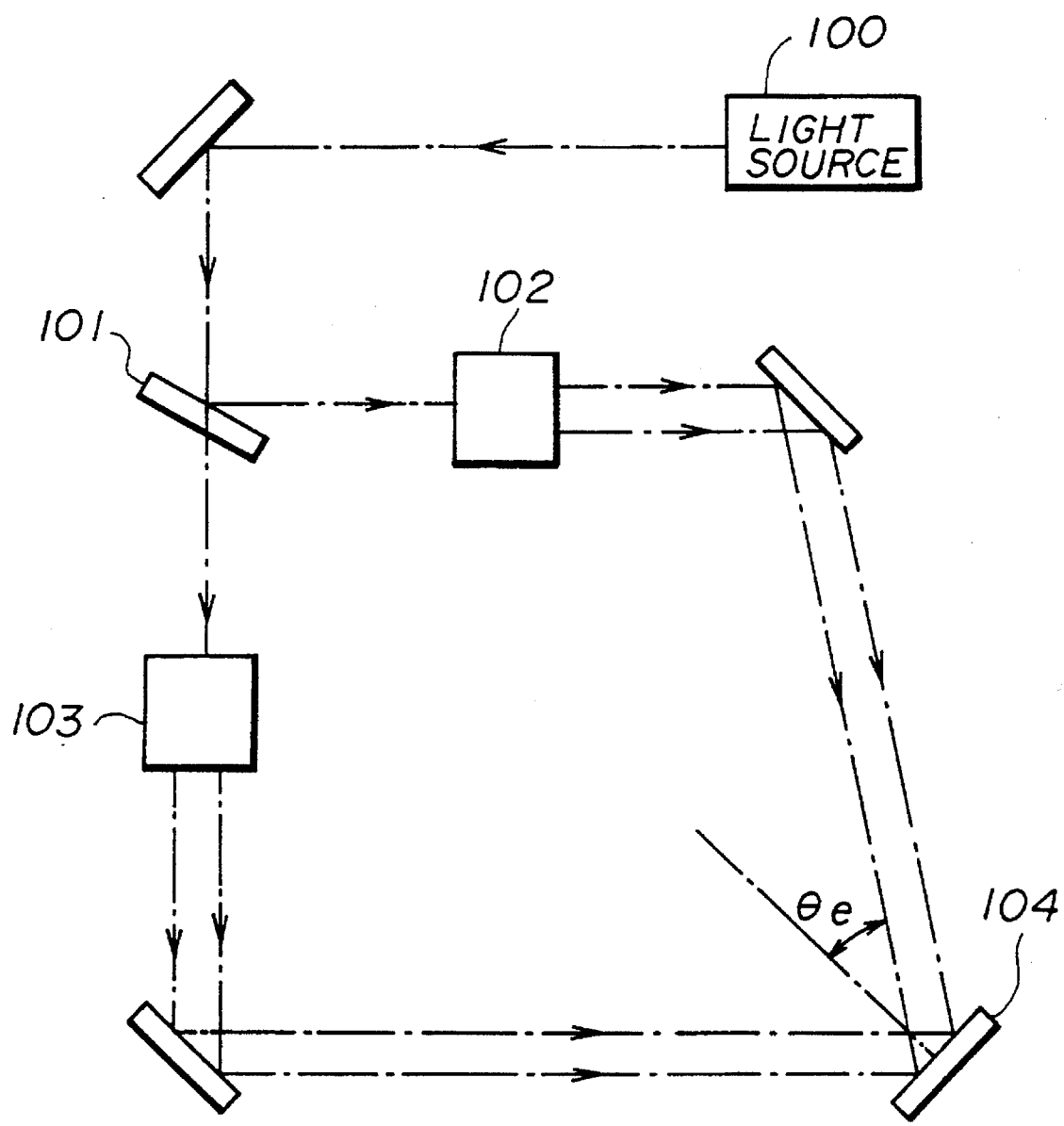
FIG. 4 is a diagram showing a grating producing system for producing a relief diffraction grating of the encoding apparatus according to the present invention.

FIG. 4 shows a grating producing system for producing the relief diffraction grating by making use of the two-beam interference method, for example. In FIG. 4, the laser light emitted from a laser light source 100 is split into two light beams by a half-mirror 101. A beam expander 102 provides a wider light beam corresponding to one of the two light beams from the half-mirror 101. A beam expander 103 provides a wider light beam corresponding to the other light beam from the half-mirror 101. These light beams from the beam expanders 102 and 103 are projected to a photosensitive substrate 104 at the same spot. The two light beams are subjected to light interference on the photosensitive substrate 104, and the result of the light interference is interference fringes of alternate dark and light bands recorded on the substrate 104.

Figure 5:
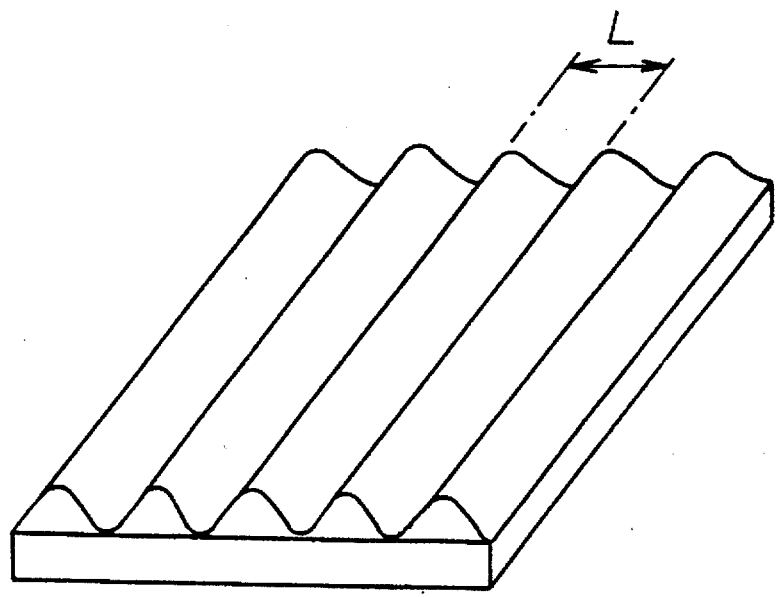
FIG. 5 is a perspective view showing a relief diffraction grating during a production process by means of the grating producing system in FIG. 4.

FIG. 5 shows a relief diffraction grating after the interference fringes on the photosensitive substrate 104 are developed. A number of parallel grooves corresponding to the interference fringes are formed in the relief diffraction grating after the end of the development, as shown in FIG. 5. The grating pitch L (the distance between two parallel grooves of this relief diffraction grating as indicated by the arrow in FIG. 5) is represented by the equation: L=l/(2·sin Θ), where l indicates the wavelength of the laser beam and Θ indicates the exposure angle. In this manner, the relief diffraction grating in FIG. 5 is obtained by subjecting the photosensitive substrate 104 to the exposure of the two light beams. After the first exposure and development have been finished, the photosensitive substrate 104 is rotated 90° and it is subjected to a secondary exposure of the two lights beams and a secondary development of interference fringes on the photosensitive substrate 104. Then, the relief diffraction grating including the number of grating recesses orthogonally arranged in columns and rows (within the x–y plane) in the diffraction grating surface as shown in FIGS. 2 and 3 can be produced by means of the grating producing device.

When the light emitted from the light source 1 enters the diffraction grating 2 of the cross grating type, shown in FIGS. 2 and 3, in a direction perpendicular to the diffraction grating surface (the x–y plane), the diffraction grating 2 produces several n-th order diffracted light rays of four diffraction directions, other than a transmitted light ray (or the 0th-order light ray).

Figure 6:
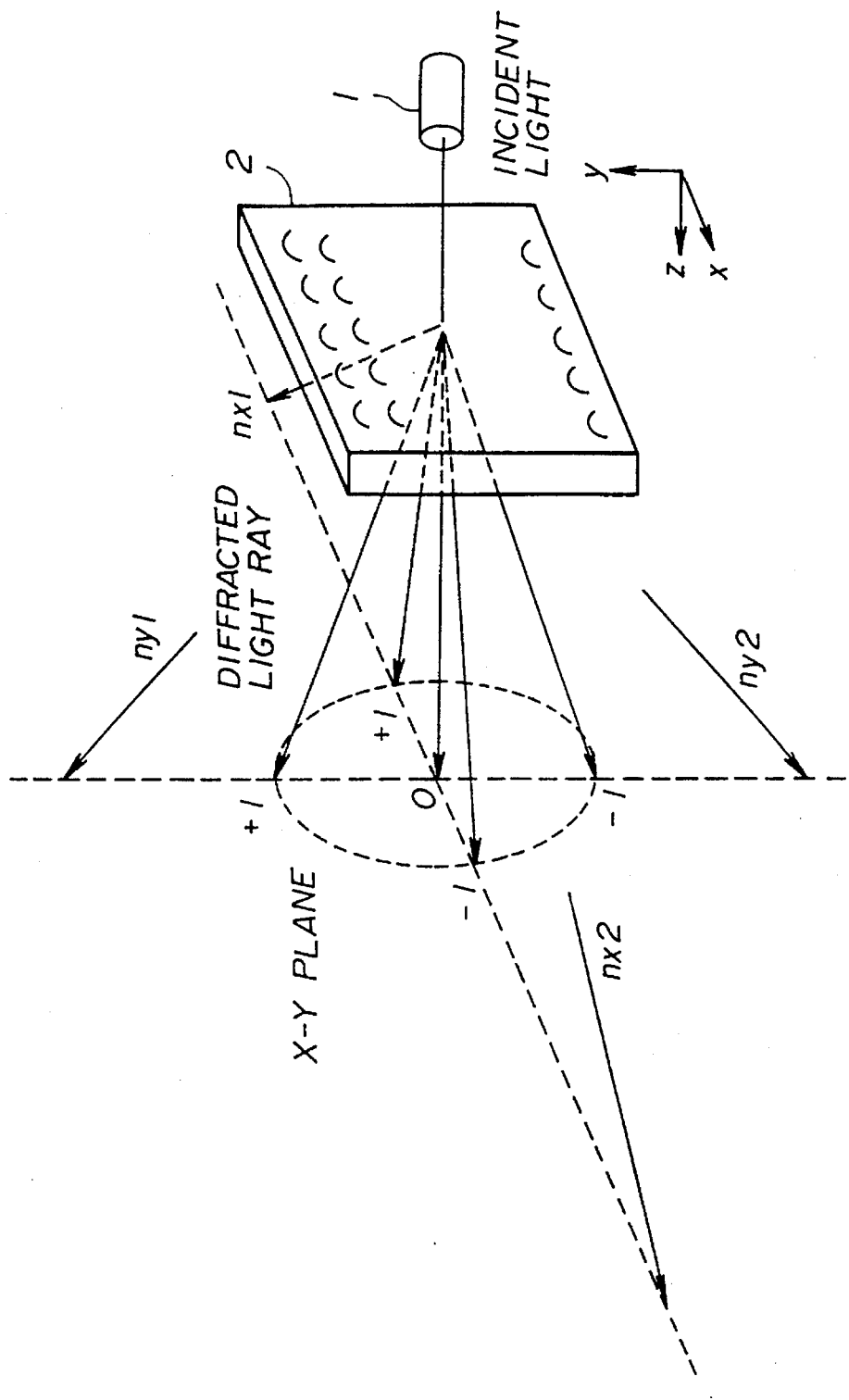
FIG. 6 is a diagram showing diffracted light from a cross diffraction grating of the encoding apparatus according to the present invention.

FIG. 6 shows this operation of the diffraction grating 2. As shown in FIG. 6, in accordance with the light from the light source 1 having entered the diffraction grating 2 in the direction perpendicular to the x–y plane, the diffraction grating 2 produces (nx1)th-order diffracted light rays and (nx2)th-order diffracted light rays both having a direction cosine on the x–z plane perpendicular to the x–y plane, and (ny1)th-order diffracted light rays and (ny2)th-order diffracted light rays both having a direction cosine on the y–z plane perpendicular to the x–z plane (where nx1, nx2, ny1, and ny2 are integers).

In the encoding apparatus in FIG. 1, the interference unit 30 produces a first interference light ray by subjecting two diffracted light rays of the (nx1)th-order and (nx2)th-order diffracted light rays among the diffracted light rays of the four directions supplied from the diffraction grating 2, to light interference. The interference unit 30 produces a second interference light ray by subjecting two diffracted light rays of the (ny1)th-order and (ny2)th-order diffracted light rays among the diffracted light rays of the four directions supplied from the diffraction grating 2, to light interference.

The photodetector 6 receives the two diffracted light rays (of (nx1)th-order and (nx2)th-order diffracted light rays) from the interference unit 30, and detects a phase change of the first interference light when an object fixed to the diffraction grating 2 is moved within the x–y plane relative to the light source 1. The phase change of the interference light can be detected by measuring a change in the quantity of the interference light at the photodetector. The photodetector 7 receives the two diffracted light rays (of the (ny1)th-order and (ny2)th-order diffracted light rays) from the interference unit 30, and detects a phase change of the second interference light ray when the object is relatively moved within the x–y plane.

Accordingly, based on the diffracted light rays produced by the diffraction grating 2 in response to the incident light emitted from the light source 1, the encoding apparatus of the present invention can make precision measurements of a two-dimensional displacement of an object fixed to the diffraction grating 2 when the object is moved within the x–y plane relative to the light source 1.

A phase change δΘn of an interference light ray produced by interference between the n-th order diffracted light rays (n: integer) when the diffraction grating 2 of the cross grating type is moved within the x–y plane is represented by the following formula.

$$\delta\Theta n = 2\pi \cdot (d/L) \cdot n \tag{1}$$

where d indicates the movement of the diffraction grating 2, and L indicates the grating pitch of the diffraction grating 2.

In addition, dx indicates the movement of the diffraction grating 2 in the x direction, and dy indicates the movement of the diffraction grating 2 in the y direction. Lx indicates one grating pitch of the diffraction grating 2 in the x direction, and Ly indicates one grating pitch of the diffraction grating 2 in the y direction, as indicated in FIG. 3.

A phase change δΘx of the interference light between the (nx1)th-order diffracted light ray and the (nx2)th-order diffracted light ray both having a direction cosine on the x–z plane is represented by the following formula.

$$\delta\Theta x = 2\pi \cdot (dx/Lx) \cdot (nx1 - nx2) \tag{2}$$

where nx1 and nx2 are integers.

A phase change δΘy of the interference light between the (my1)th-order diffracted light ray and the (ny2)th-order diffracted light ray both having a direction cosine on the y–z plane is represented by the following formula.

$$\delta\Theta y = 2\pi \cdot (dy/Ly) \cdot (ny1 - ny2) \quad (3)$$

where ny1 and ny2 are integers.

As described above, in the encoding apparatus according to the present invention, the photodetector 6 receives the two diffracted light rays (of (nx1)th-order and (nx2)th-order diffracted light rays) from the interference unit 30, and detects a phase change "δΘx" of the interference light when the diffraction grating 2 is moved within the x–y plane relative to the light source 1. Thus, the x-directional movement "dx" of the diffraction grating 2 can be determined based on the above formula (2).

The photodetector 7 receives the two diffracted light rays (of the (ny1)th-order and (ny2)th-order diffracted light rays) from the interference unit 30, and detects a phase change "δΘy" of the interference light when the diffraction grating 2 is relatively moved within the x–y plane. Thus, the y-directional movement "dy" of the diffraction grating 2 can be determined based on the above formula (3).

Next, a description will be given, with reference to FIG. 7, of a first embodiment of the encoding apparatus according to the present invention.

Figure 7:
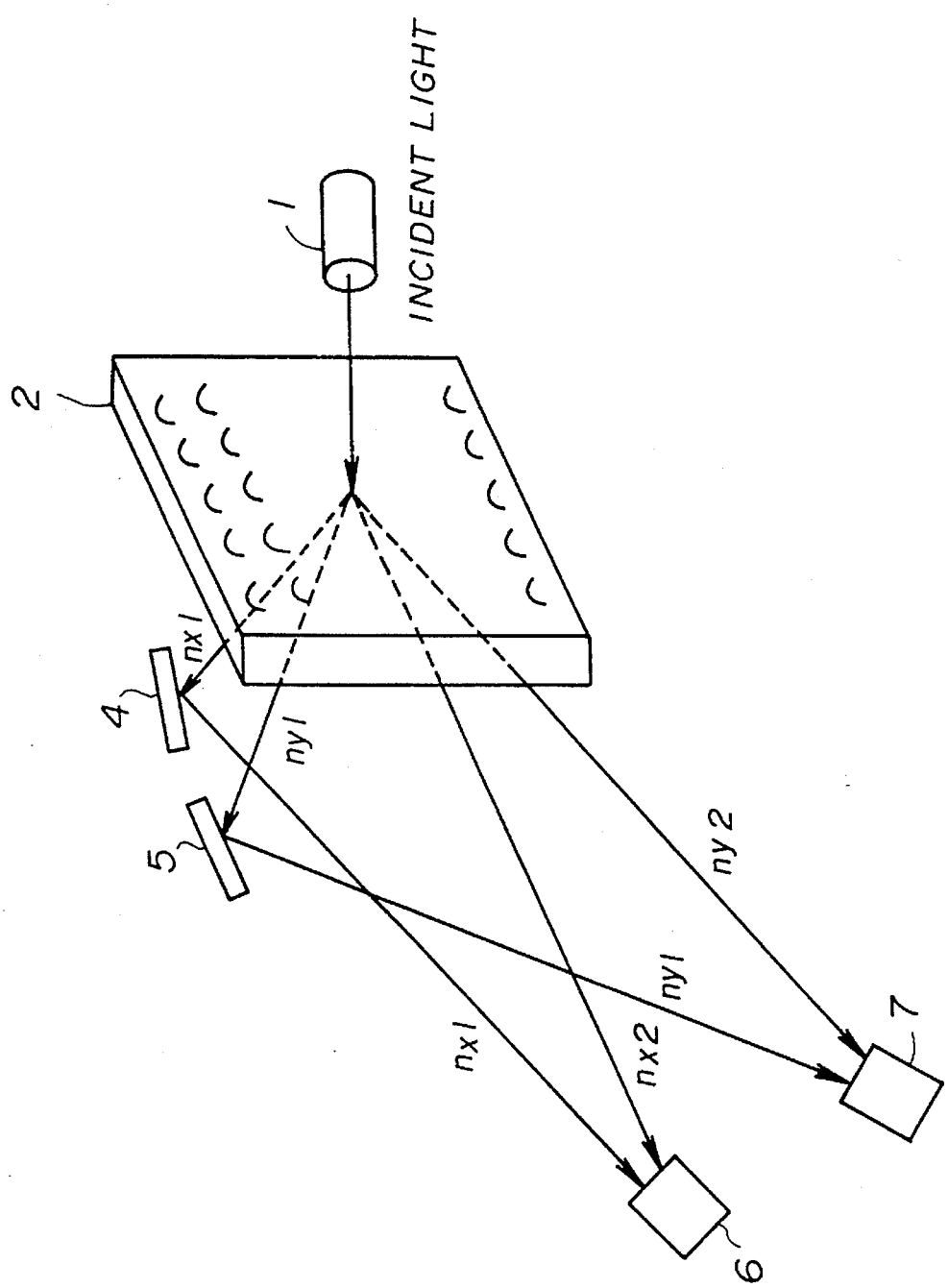
FIG. 7 is a diagram showing a first embodiment of the encoding apparatus according to the present invention.

The encoding apparatus shown in FIG. 7 includes the light source 1, the diffraction grating 2, two mirrors 4 and 5, and the photodetectors 6 and 7. The two mirrors 4 and 5 are used as the interference unit 30 of the encoding apparatus according to the present invention. The light emitted from the light source 1 enters the diffraction grating 2 in the perpendicular direction (the z direction), and the diffraction grating 2 produces several diffracted light rays of four diffracting directions: (nx1)th, (nx2)th, (ny1)th, and (ny2)th order diffracted light rays.

An (nx2)th order diffracted light ray from the diffraction grating 2 enters the photodetector 6. The mirror 4 reflects an (nx1)th order diffracted light ray from the diffraction grating 2, and the reflected light ray enters the photodetector 6, so that the (nx1)th order diffracted light ray and the (nx2)th order diffracted light ray interfere with each other. As the result of the light interference, a first interference light ray enters the photodetector 6, and the photodetector 6 detects a phase change of the first interference light ray when the diffraction grating 2 is relatively moved within the x–y plane.

On the other hand, an (ny2)th order diffracted light ray from the diffraction grating 2 enters the photodetector 7. The mirror 5 reflects an (my1)th order diffracted light ray from the diffraction grating 2, and the reflected light ray enters the photodetector 7. The (ny1)th order diffracted light ray and the (ny2)th order diffracted light ray interfere with each other, and, as the result of the light interference, a second interference light ray enters the photodetector 7. The photodetector 7 detects a phase change of the second interference light ray when the diffraction grating 2 is relatively moved within the x–y plane.

In the encoding apparatus of the first embodiment in FIG. 7, the light source 1 and the diffraction grating 2 are arranged such that the incident light emitted from the light source 1 enters the diffraction grating 2 in the perpendicular direction (the z direction). The mirror 4 is arranged in the encoding apparatus so as to reflect, for example, a (+1)th order diffracted light ray of the (nx1)th order diffracted light rays from the diffraction grating 2, to the photodetector 6. The mirror 5 is arranged in the encoding apparatus so as to reflect, for example, a (+1)th order diffracted light ray of the (ny1)th order diffracted light rays from the diffraction grating 2, to the photodetector 7.

The incident light emitted from the light source 1 enters the diffraction grating 2 in the direction (the z direction) perpendicular to the x–y plane, and the diffraction grating 2 of the cross grating type produces several n-th order diffracted light rays of four diffraction directions, other than the transmitted light ray which is passed through the diffraction grating 2.

The (+1)th order diffracted light ray reflected from the mirror 4, and a (−1)th order diffracted light ray of the (nx2)th order diffracted light rays from the diffraction grating 2 are made almost in parallel, and interfere with each other. As the result of the interference, the first interference light ray enters the photodetector 6. The (+1)th order diffracted light ray reflected from the mirror 5, and a (−1)th order diffracted light ray of the (ny2)th order diffracted light rays from the diffraction grating 2 are made almost in parallel, and interfere with each other. As the result of the interference, the second interference light ray enters the photodetector 7.

For example, if the x-directional movement of the diffraction grating 2 within the x–y plane is equal to one grating pitch "Lx" and the y-directional movement thereof is equal to one grating pitch "Ly", the phase change of the first interference light detected by the photodetector 6 is "4π·dx/Lx" according to the formula (2), and the phase change of the second interference light detected by the photodetector 7 is "4π·dy/Ly" according to the formula (3). In this example, as the Lx, nx1, nx2, Ly, ny1 and ny2 are given values of the diffraction grating 2, the x-directional movement "dx" and y-directional movement "dy" of the diffraction grating 2 can be determined by the following formula if the phase changes δΘx and δΘy have been detected by the photodetectors 6 and 7.

$$dx = \delta\Theta x \cdot Lx/4\pi$$

$$dy = \delta\Theta y \cdot Ly/4\pi \quad (4)$$

In addition, if the x-directional movement of the diffraction grating 2 is equal to, for example, a half grating pitch "Lx/2" and the y-directional movement thereof is equal to, for example, a half grating pitch "Ly/2", the phase change of the first interference light detected by the photodetector 6 is "2π" according to the formula (2), and the phase change of the second interference light detected by the photodetector 7 is "2π" according to the formula (3). Therefore, in this example, if the phase changes detected by the photodetectors 6 and 7 are equal to "2π", it can be determined that the diffraction grating 2 is relatively moved by "Lx/2" in the x direction and "Ly/2" in the y direction.

In the first embodiment described above, the diffraction order values "nx1" "nx2" "ny1" and "ny2" which are equal to +1, −1, +1 and −1 respectively are selected. Thus, both the absolute values |nx1−nx2| and |ny1−ny2| are equal to 2. However, the present invention is not limited to this example, and any of combinations of the diffraction order values can be used for making measurements of a displacement of an object if the diffraction order values are selected from among the diffracted light rays within the same plane. The greater the absolute values of the differences of the selected diffraction order values, the higher the sensitivity of the detection of the phase change.

In the first embodiment described above, It is necessary that the encoding apparatus has a sufficient distance between the mirror 4 and the photodetector 6 and has a sufficient distance between the mirror 5 and the photodetector 7 to make the two diffracted light rays interfere with each other. However, in order to build a smaller encoding apparatus, it is desirable to make the distances between the mirrors and the photodetectors as small as possible.

Next, a description will be given, with reference to FIG. 8, of a second embodiment of the encoding apparatus according to the present invention. The second embodiment is directed to provide a smaller encoding apparatus by making the optical path distance, needed to produce interference light from the two diffracted light rays, as small as possible.

Figure 8:
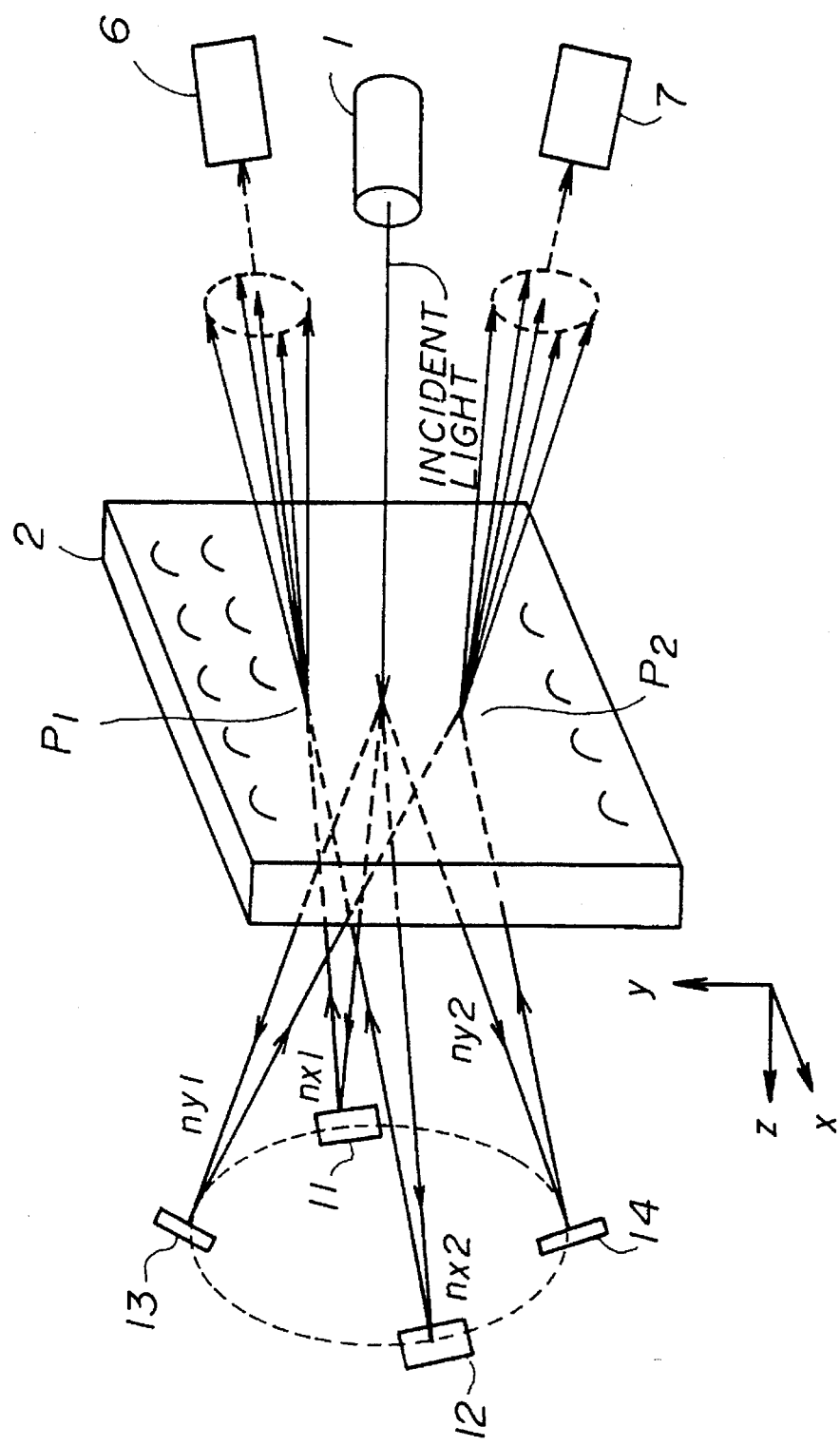
FIG. 8 is a diagram showing a second embodiment of the encoding apparatus according to the present invention.

FIG. 8 shows an encoding apparatus of the second embodiment. The encoding apparatus in FIG. 8 includes the light source 1, the diffraction grating 2, the photodetectors 6 and 7, and a reflection unit including a pair of mirrors 11 and 12 and a pair of mirrors 13 and 14. The reflection unit is used instead of the mirrors 4 and 5 shown in FIG. 7. In FIG. 8, the mirrors 11 and 12 respectively reflect the (nx1)th order and (nx2)th order diffracted light rays, supplied from the diffraction grating 2, back to the diffraction grating 2. The two reflected light rays interfere with each other and the first interference light is produced on the diffraction grating 2 at a first position P1. The mirrors 13 and 14 respectively reflect the (ny1)th order and (ny2)th order diffracted light rays, supplied from the diffraction grating 2, back to the diffraction grating 2. The two reflected light rays interfere with each other, and the second interference light is also produced on the diffraction grating 2 at a second position P2.

In the encoding apparatus in FIG. 8, the photodetectors 6 and 7 are arranged on the same side as the light source 1 with respect to the diffraction grating 2, so that the first and second interference light rays from the diffraction grating 2 enter the photodetectors 6 and 7 respectively.

In the encoding apparatus of the second embodiment in FIG. 8, the diffraction grating 2 produces the (nx1)th-order, (nx2)th-order, (ny1)th-order and (ny2)th-order diffracted light rays of the four diffraction directions, other than the transmitted light ray, in accordance with the incident light from the light source 1. The mirror 11 reflects, for example, a (+1)th order diffracted light ray of the (nx1)th-order diffracted light rays from the diffraction grating 2, back to the position P1 of the diffraction grating 2. The mirror 12 reflects, for example, a (−1)th order diffracted light ray of the (nx2)th-order diffracted light rays from the diffraction grating 2, back to the position P1 of the diffraction grating 2.

The (+1)th order diffracted light ray reflected from the mirror 11, and the (−1)th order diffracted light ray reflected from the mirror 12 interfere with each other on the diffraction grating 2. The (+1)th order diffracted light ray reflected from the mirror 11 passes through or diffracted from the diffraction grating 2 at the position P1. The (−1)th order diffracted light ray reflected from the mirror 12, also, passes through or diffracted from the diffraction grating 2 at the position P1. As the result of the interference, the first interference light ray enters the photodetector 6.

The mirror 13 reflects, for example, a (+1)th order diffracted light ray of the (ny1)th-order diffracted light rays from the diffraction grating 2, back to the position P2 of the diffraction grating 2. The mirror 14 reflects, for example, a (−1)th order diffracted light ray of the (ny2)th-order diffracted light rays from the diffraction grating 2, back to the position P2 of the diffraction grating 2.

The (+1)th order diffracted light ray reflected from the mirror 13, and the (−1)th order diffracted light ray reflected from the mirror 14 interfere with each other on the diffraction grating 2. The (+1)th order diffracted light ray reflected from the mirror 13 passes through or diffracted from the diffraction grating 2 at the position P2. The (−1)th order diffracted light ray reflected from the mirror 14, also, passes through or diffracted from the diffraction grating 2 at the position P2. As the result of the interference, the second interference light ray enters the photodetector 7.

Accordingly, the photodetector 6 detects a phase change $\delta\Theta x'$ of the first interference light produced by interference between the transmitted or diffracted light rays of the (nx1)th order diffracted light rays and the transmitted or diffracted light rays of the (nx2)th order diffracted light rays. The photodetector 7 detects a phase change $\delta\Theta y'$ of the second interference light produced by interference between the transmitted or diffracted light rays of the (ny1)th order diffracted light ray and the transmitted or diffracted light rays of the (ny2)th order diffracted light rays. Thus, it is possible that the encoding apparatus of the second embodiment make precision measurements of a two-dimensional displacement of an object fixed to the diffraction grating 2 in accordance with the above formulas (2) and (3), based on the detected phase changes $\delta\Theta x'$ and $\Theta y'$.

In the second embodiment described above, the optical path distance, needed to produce the first and second interference light rays from the two diffracted light rays, can be reduced to the distance between the diffraction grating 2 and the reflection unit. This distance can be easily made remarkably smaller than the distances between the mirrors and the photodetectors in FIG. 7. Therefore, it is possible to provide a smaller encoding apparatus.

Generally, the position P1 at which the (nx1)th-order and (nx2)th-order diffracted light rays from the mirrors 11 and 12 pass through or are diffracted from the diffraction grating 2 is different from the position P2 at which the (ny1)th-order and (ny2)th-order diffracted light rays from the mirrors 13 and 14 pass through or are diffracted from the diffraction grating 2. However, it is possible that the positions P1 and P2 accord with the original incident position P0 at which the incident light emitted from the light source 1 enters the diffraction grating 2.

Figure 9:
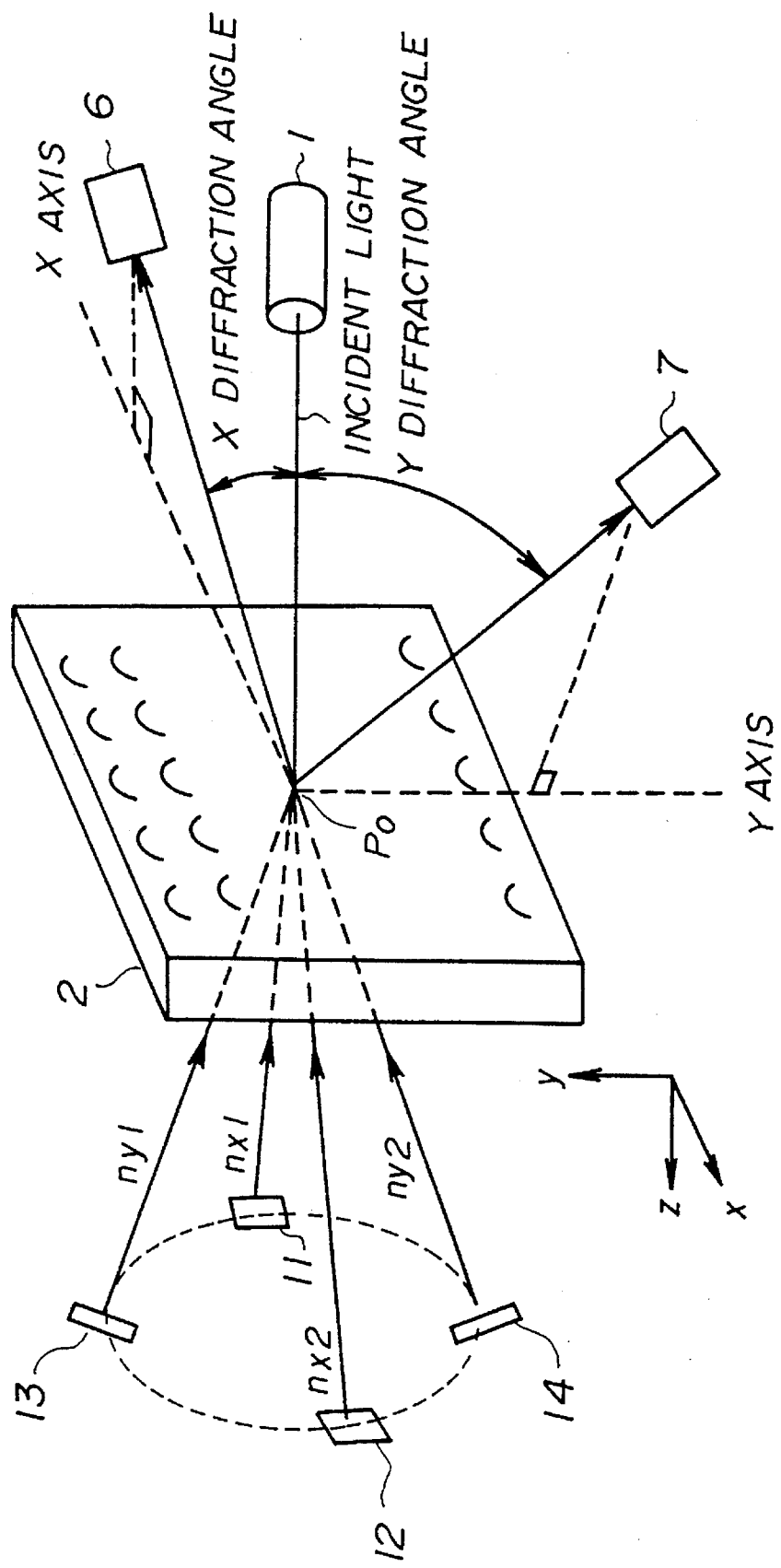
FIG. 9 is a diagram for explaining the operation of the encoding apparatus shown in FIG. 8.

FIG. 9 shows a modification of the encoding apparatus shown in FIG. 8. In the encoding apparatus shown in FIG. 9, the positions P1 and P2 mentioned above accord with the original incident position P0. By making use of the encoding apparatus shown in FIG. 9, the area of the diffraction grating 2 can be reduced to a remarkably small area.

In the case of the encoding apparatus in FIG. 9, it is necessary to explicitly separate the first interference light ray, produced from the diffracted light rays each having a direction cosine on the x–z plane, from the second interference light ray, produced from the diffracted light rays each having a direction cosine on the y–z plane. Also, it is necessary to make the thus separated first and second interference light rays enter the photodetectors 6 and 7 respectively. In order to resolve these problems, a first interference light ray having an x-directional diffraction angle greater than a certain diffraction angle to the incident light from the light source 1, as indicated in FIG. 9, is selected and the selected interference light ray is directed to the photodetector 6. At the same time, a second interference light ray having a y-directional diffraction angle greater than a certain diffraction angle to the incident light, as indicated in FIG. 9, is selected and the selected interference light ray is directed to the photodetector 7.

In the second embodiment described above, the reflection unit, including the four mirrors 11 through 14 for reflecting the diffracted light rays from and to the diffraction grating 2, is used. When the wavelength of the incident light from the light source 1 varies, the diffraction angles of the diffracted light rays from the diffraction grating 2 change. If the diffracted light rays of diffraction directions, different from the original diffraction directions, are produced by the diffraction grating 2, the four mirrors 11 through 14 cannot reflect the diffracted light rays back to the correct positions of the diffraction grating 2.

Figure 10:
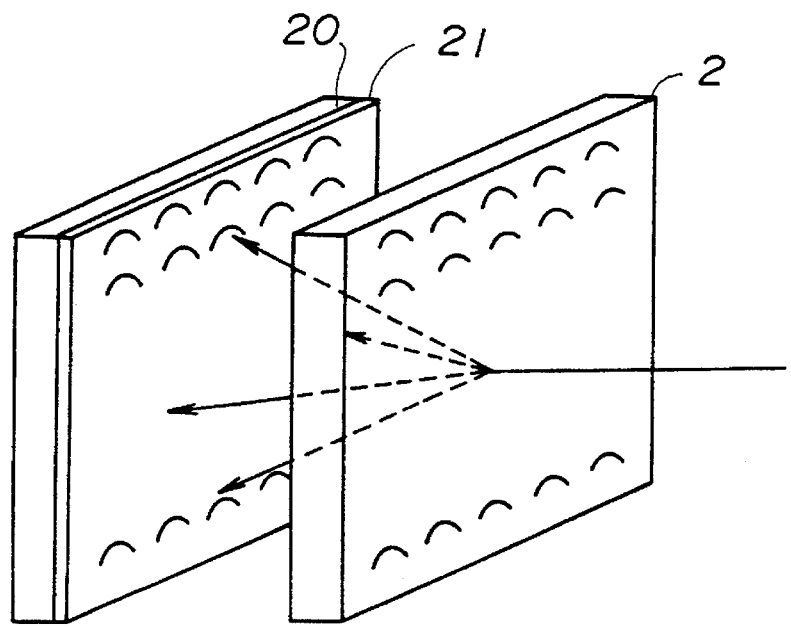
FIG. 10 is a perspective view showing a reflection type diffraction grating used in the encoding apparatus in FIG. 9.

In order to resolve the problem mentioned above, an encoding apparatus including a reflection type diffraction grating which is separate from the diffraction grating 2 and used instead of the reflection unit of the second embodiment is provided according to the present invention. FIG. 10 shows the reflection type diffraction grating 20. The reflection type diffraction grating 20 in FIG. 10 is of the cross grating type including a number of fine grating recesses orthogonally arranged in columns and rows (within the x–y plane) in the diffraction grating surface, similarly to the above described diffraction grating 2. The reflection type diffraction grating 20 includes a reflective metal layer 21 on the diffraction grating surface of the diffraction grating 20. This reflective metal layer 21 can be produced on the diffraction grating surface by evaporation of a suitable metal material, preferably aluminum.

In the case of the encoding apparatus including the reflection type diffraction grating 20 shown in FIG. 10, it is possible to make accurate measurements of a two-dimensional displacement of an objected fixed to the diffraction grating 2 even when the wavelength of the incident light from the light source varies. If the diffraction angles of the diffracted light rays from the diffraction grating 2 change in response to the change of the wavelength of the incident light from the light source, the diffraction angles of the diffracted light rays from the diffraction grating 20 also change in the same way. Thus, the reflection type diffraction grating 20 can reflect the diffracted light rays from the diffraction grating 2 back to the correct positions of the diffraction grating 2. It is not necessary to provide different reflection units for individual changes of the wavelength of the incident light from the light source.

In the diffraction grating 20 in FIG. 10, the reflective metal layer 21 is produced on the diffraction grating surface by evaporation of a suitable metal material. The reflective metal layer 21 is formed on the diffraction grating surface of the diffraction grating 20 nearer to the diffraction grating 2. As the diffraction grating surface includes the number of fine grating recesses and is not flat, it is difficult to produce a reflective metal layer having a uniform thickness on the non-flat diffraction grating surface without using a special metal evaporation producing device.

In order to resolve the above mentioned problem, a different reflection type diffraction grating including a flat reflection layer formed on the opposite surface of the diffraction grating 20, which surface is located opposite to the diffraction grating 2, may be used.

Figure 11:
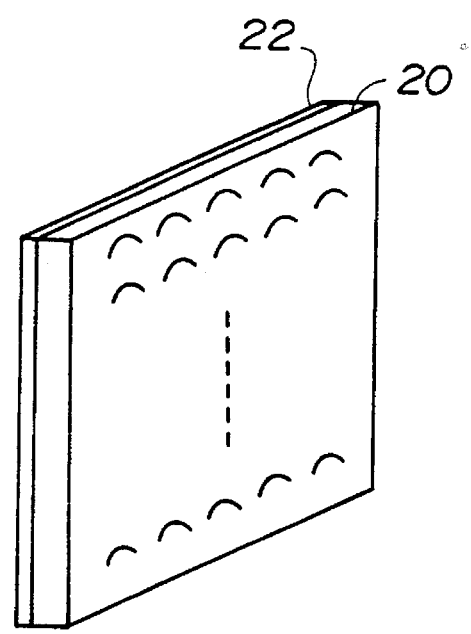
FIG. 11 is a perspective view showing another reflection type diffraction grating used in the encoding apparatus in FIG. 9.

FIG. 11 shows a modification of the reflection type diffraction grating 20 shown in FIG. 10. In FIG. 11, the reflection type diffraction grating 20 includes a flat mirror 22 formed on the opposite surface of the diffraction grating 20, which surface is located opposite to the diffraction grating 2. As the opposite surface of the diffraction grating 20 is flat, the flat mirror 22 can be easily produced on the reflection type diffraction grating 20. The effect of the reflection of the diffracted light rays to the photodetectors by means of the flat mirror 22 is the same as the effect by means of the reflective metal layer 21 described above.

In the above described first and second embodiments, the encoding apparatus makes measurements of a two-dimensional displacement of an object within the x–y plane of the x–y–z orthogonal coordinate system, by means of the plane diffraction grating of the cross grating type. However, the present invention is not limited to these embodiments. It is also possible to make measurements of a two-dimensional displacement of an object within an arbitrary one of other coordinate systems defined by two coordinate axes. For example, it is possible to make measurements of a two-dimensional displacement of an object within the o-Φ plane, by means of a semi-spherical diffraction grating of the cross grating type.

In the above described first and second embodiments, the light emitted from the light source enters the diffraction grating in a direction perpendicular to the diffraction grating surface. However, it is possible that the light source 1 and the diffraction grating 2 are arranged to make the incident light from the light source 1 enter the diffraction grating 2 in a slanting direction to the diffraction grating surface. The arrangement of these parts varies depending on the configurations of the grating recesses of the diffraction grating.

Figure 32:
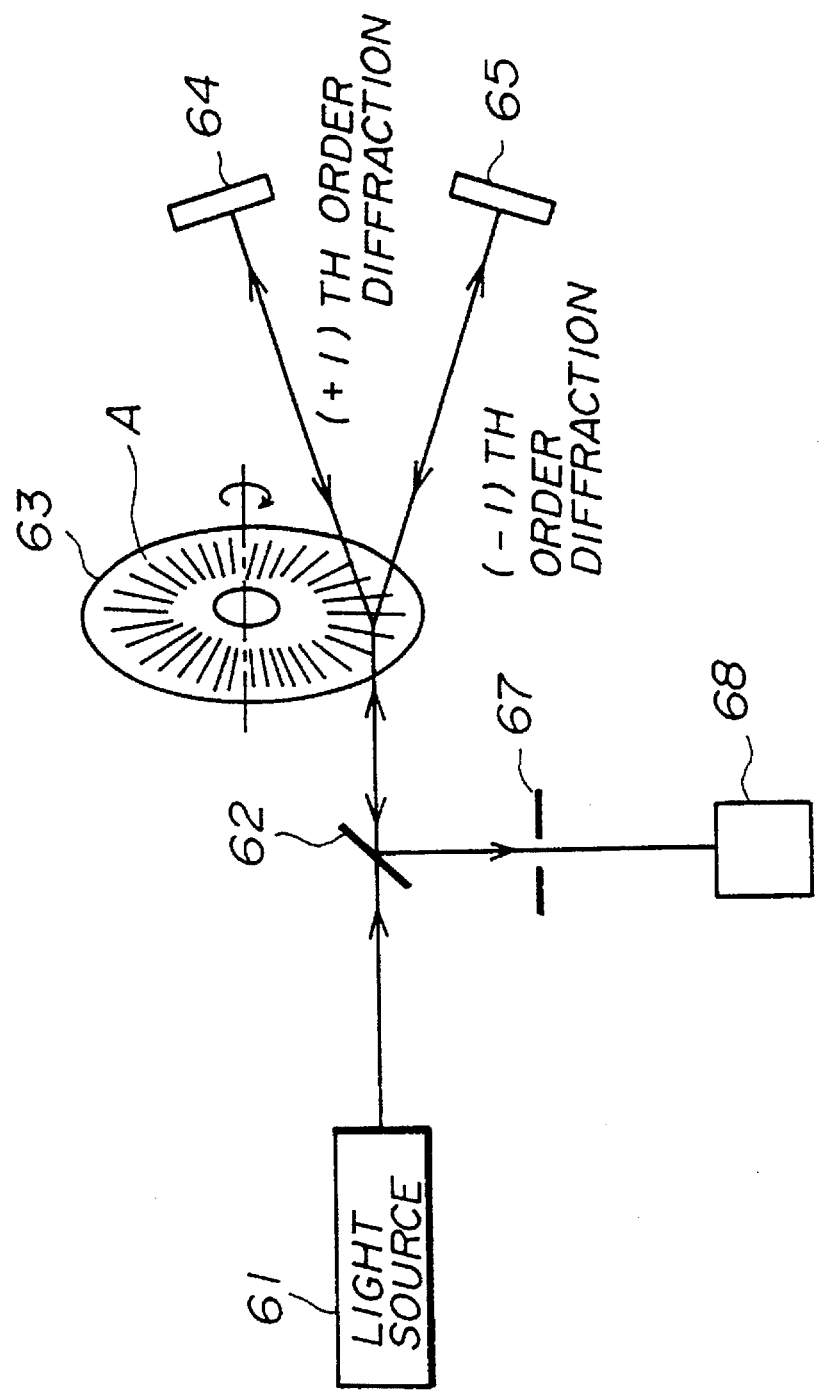
FIG. 32 is a diagram showing a known encoding apparatus.

In the above described first and second embodiments, a pinhole may be provided in each of optical paths through which the first and second interference light rays enter the photodetectors 6 and 7, similarly to that of the known encoding apparatus shown in FIG. 32. By means of the pinholes in the optical paths, it is possible to make the output signals of the photodetectors when the diffraction grating 2 is relatively moved within the x–y plane have a waveform similar to a sine signal waveform.

Next, a description will be given, with reference to FIG. 12, of a third embodiment of the encoding apparatus according to the present invention.

Figure 12:
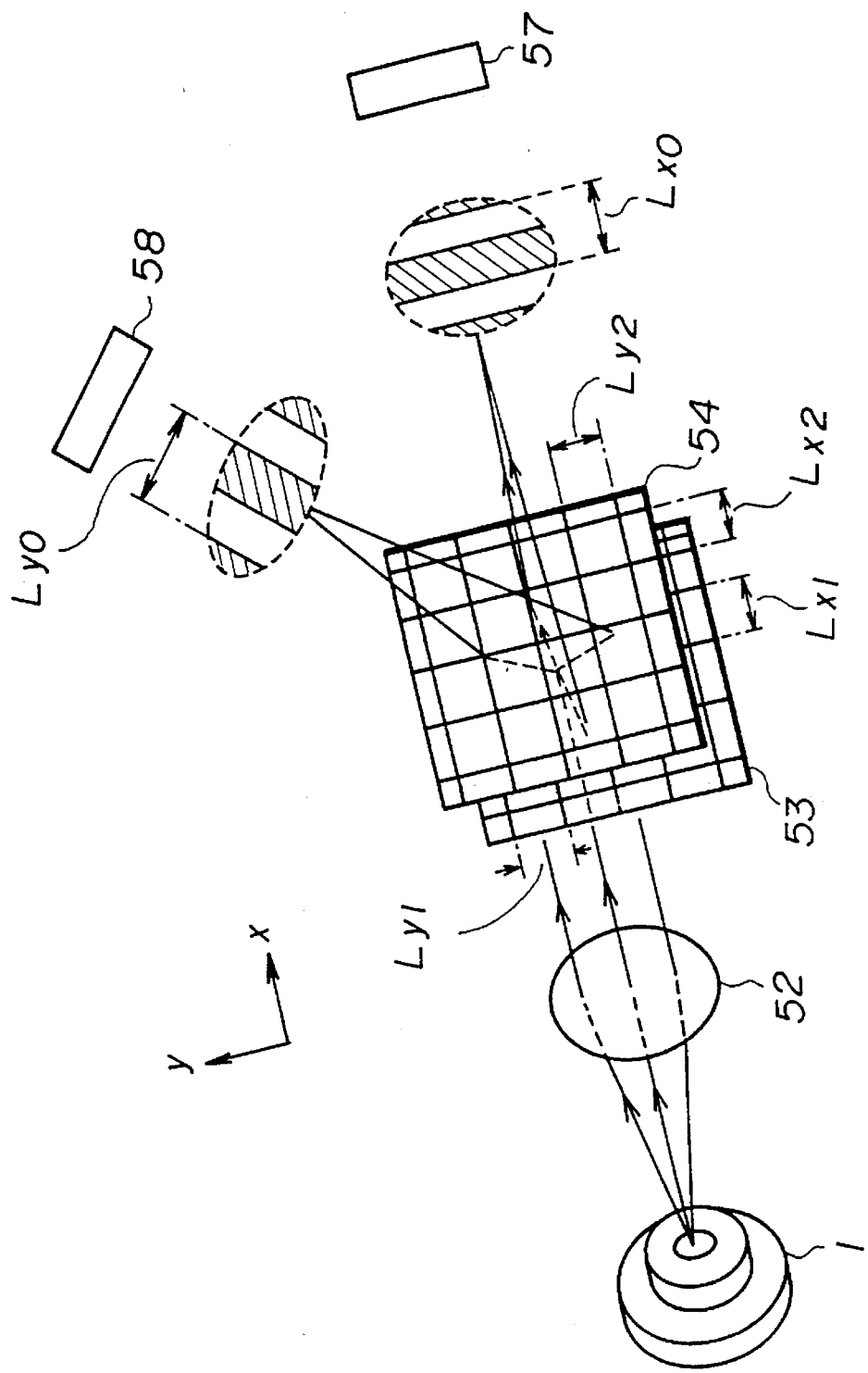
FIG. 12 is a diagram showing a third embodiment of the encoding apparatus according to the present invention.

The encoding apparatus in FIG. 12 includes the light source 1, a collimator lens 52, a first diffraction grating 53, a second diffraction grating 54, and two photodetectors 57 and 58.

In the encoding apparatus of the third embodiment in FIG. 12, each of the first and second diffraction gratings 53 and 54 is of the cross grating type shown in FIGS. 2 and 3. The first diffraction grating 53 has an x-directional grating pitch Lx1 of the grating recesses and a y-directional grating pitch Ly1 of the grating recesses. The second diffraction grating 54 has an x-directional grating pitch Lx2 of the grating recesses and a y-directional grating pitch Ly2 of the grating recesses. The first and second diffraction gratings 53 and 54 are arranged such that the diffraction grating surfaces of the gratings 53 and 54 are parallel to each other and placed on the same side toward the photodetectors 57 and 58.

The light emitted from the light source 1 is collimated into parallel light rays by the collimator lens 52. The collimated light rays from the collimator lens 52 enter the first diffraction grating 53. The first diffraction grating 53 produces several first-occurrence n-th order diffracted light rays of four diffraction directions (which are the (nx1)th-order, (nx2)th-order, (ny1)th-order, and (ny2)th-order diffracted light rays, where nx1, nx2, ny1 and ny2 are integers) in response to the light rays from the collimator lens 52.

Since the first-occurrence n-th order diffracted light rays from the first diffraction grating 53 enter the second diffraction grating 53, the second diffraction grating 54 produces several second-occurrence m-th order diffracted light rays of four diffraction directions (which are the (mx1)th-order, (mx2)th-order, (my1)th-order, and (my2)th-order diffracted light rays, where mx1, mx2, my1 and my2 are integers).

As the result of the light interference between the two x-directional m-th order diffracted light rays from the second diffraction grating 54, a first interference light ray is produced and it enters the photodetector 57. As the result of the light interference between the two y-directional m-th order diffracted light rays from the second diffraction grating 54, a second interference light ray is produced and it enters the photodetector 58. As shown in FIG. 12, both the interference fringes due to the first interference light ray with respect to the x direction and the interference fringes due to the second interference light ray with respect to the y direction appear.

The photodetector 57 detects a phase change of the above described first interference light when the second diffraction grating 54 is relatively moved within the x–y plane. The photodetector 58 detects a phase change of the above described second interference light when the second diffraction grating 54 is relatively moved within the x–y plane.

In the third embodiment described above, the interference fringes of the two kinds with respect to the x and y directions are independently produced from the two diffracted light rays from the two diffraction gratings under the same principle. Thus, the production of the interference fringes performed by the encoding apparatus will be described here with respect to only one direction, instead of describing the same with respect to each of the x and y directions, for the sake of convenience.

Figure 13:
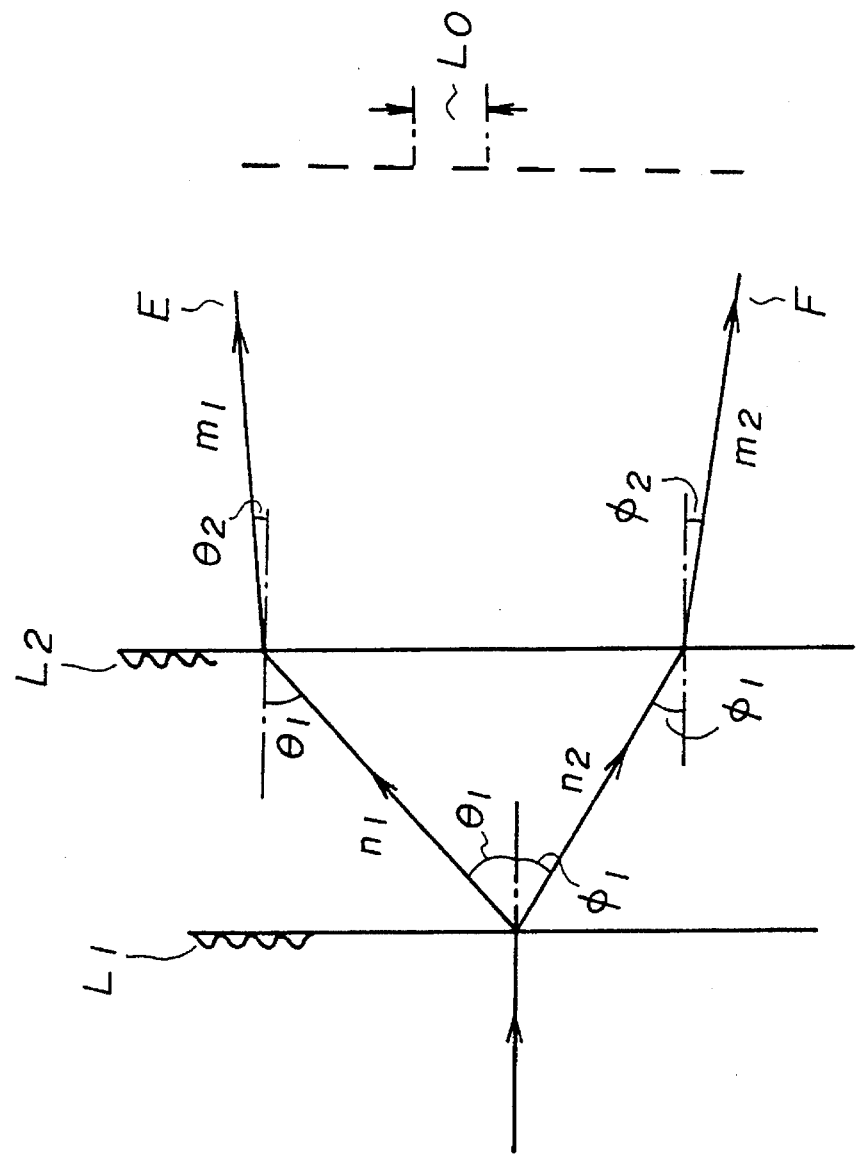
FIG. 13 is a diagram for explaining the operation of the encoding apparatus in FIG. 12.

FIG. 13 shows the operation of the first and second diffraction gratings of the encoding apparatus in FIG. 12. In FIG. 13, the interference fringes with respect to one direction (either the x direction or the y direction) are produced from two diffracted light rays E and F.

A first-occurrence n1-th order diffracted light ray with a diffraction angle $\Phi 1$ is produced from the first diffraction grating 53, and a second-occurrence m1-th order diffracted light ray with a diffraction angle $\Theta 2$ is produced from the second diffraction grating 54. This second-occurrence light ray is the light ray E. A first-occurrence n2-th order diffracted light ray with a diffraction angle $\Phi 1$ is produced from the first diffraction grating 53, and a second-occurrence m2-th order diffracted light ray with a diffraction angle $\Phi 2$ is produced from the second diffraction grating 54. This second-occurrence light ray is the light ray F.

With respect to the light ray E, $$\sin \Theta 1 = n1 \cdot 1/L1 \tag{5}$$

$$-\sin \Theta 2 + \sin \Theta 1 = m1 \cdot 1/L2 \tag{6}$$

where "1" indicates the wavelength of the light emitted from the light source, "L1" indicates the grating pitch of the first diffraction grating, and "L2" indicates the grating pitch of the second diffraction grating.

From the above formulas (5) and (6), $$\sin \Theta 2 = 1 \cdot (n1/L1 - m1/L2). \tag{7}$$

Similarly, with respect to the light ray F, $$\sin \Phi 2 = -1 \cdot (n2/L1 - m2/L2). \tag{8}$$

The pitch L0 of the interference fringes is represented by $$L0 = 1/(\sin \Theta 2 + \sin \Phi 2) \tag{9}$$

From the above formulas (7), (8) and (9), $$L0 = 1/[(n1-n2)/L1 - (m1-m2)/L2] \tag{10}$$

From the formula (10), it is apparent that the pitch L0 of the interference fringes is determined depending on the grating pitches L1 and L2 of the first and second diffraction gratings 53 and 54, and that the pitch L0 is not in connection with the wavelength of the light emitted from the light source.

Therefore, by means of the two diffraction gratings used by the third embodiment described above, it is possible to make accurate measurements of a two-dimensional displacement of an object without lowering the sensitivity even when the wavelength of the incident light from the light source varies.

In addition, the number of the interference fringes can be suitably changed by setting the values of the grating pitches L1 and L2 and the values of the diffraction order numbers n1, n2, m1 and m2. As it is necessary that the two light rays from the second diffraction grating 54 are made parallel to each other, the diffraction order numbers n1, n2, m1 and m2 must satisfy the following requirement in the case in which the grating pitch L1 is nearly equal to the pitch L0.

$$n1+m1=n2+m2 \tag{11}$$

Roughly speaking, the values of the diffraction order numbers n1, n2, m1 and m2 can be freely set as far as the requirement of the above formula (11) is satisfied.

From the foregoing, the pitch Lv0 of the interference fringes with respect to one direction v (which indicates either the x direction or the y direction for the sake of convenience) produced from the two light rays E and F is represented by $$Lv0 = |1/[(nv1-nv2)/Lv1 - (mv1-mv2)/Lv2]| \tag{12}$$

Figure 16A:
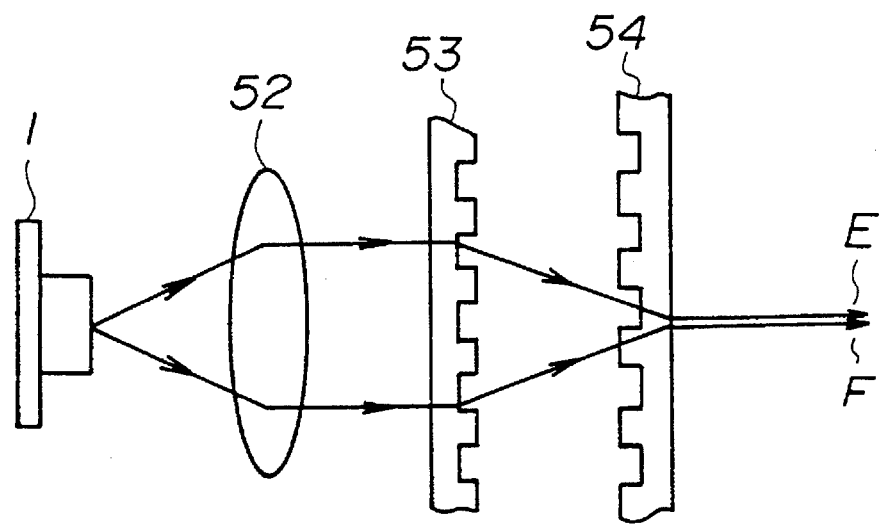
FIGS. 16A and 16B are diagrams for explaining the operation of the light source of the encoding apparatus in FIG. 12.
Figure 16B:
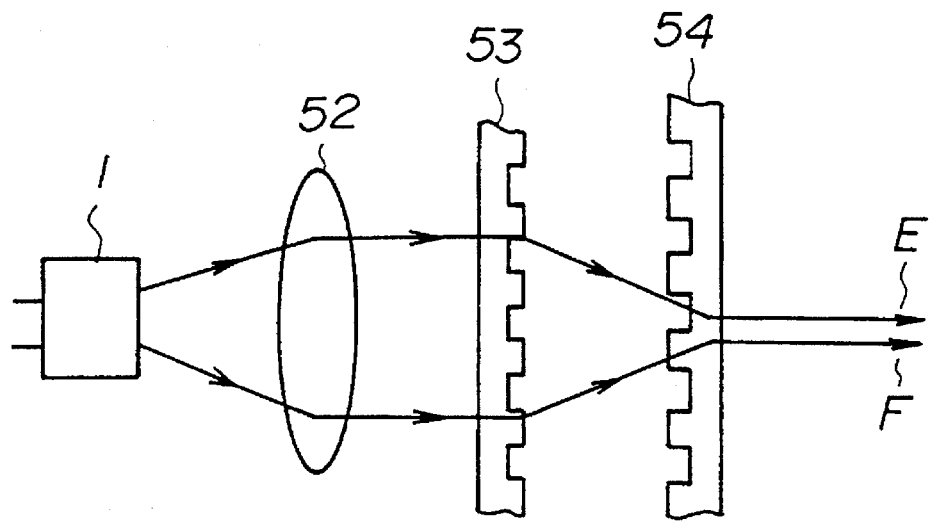

In the third embodiment described above, only a point light source such as a semiconductor laser or a light emitting diode (LED) having a very small emission area can be used as the light source 1. It is difficult to use a light emitting diode (LED) having a relatively great emission area as the light source 1. FIG. 16A shows an encoding apparatus of the third embodiment in which a point light source is used as the light source 1. As the light emitted from this point light source is projected to the diffraction gratings 53 and 54, the light rays E and F diffracted from the diffraction grating 54 can interfere with each other so that the interference fringes are produced. FIG. 16B shows an encoding apparatus of the third embodiment in which a light emitting diode (LED) having a relatively great emission area is used as the light source 1. In the encoding apparatus shown in FIG. 16B, the two light rays E and F diffracted from the diffraction grating 54 are separated from each other as the light rays emitted from the light source having a relatively great emission area are projected, and it is impossible to obtain the interference fringes from the two diffracted light rays E and F.

Accordingly, it is desirable to provide an encoding apparatus in which not only a point light source with a relatively small emission area but also a light emitting diode with a relatively great emission area can be used as the light source 1.

Next, a description will be given, with reference to FIG. 14, of a fourth embodiment of the encoding apparatus according to the present invention.

Figure 14:
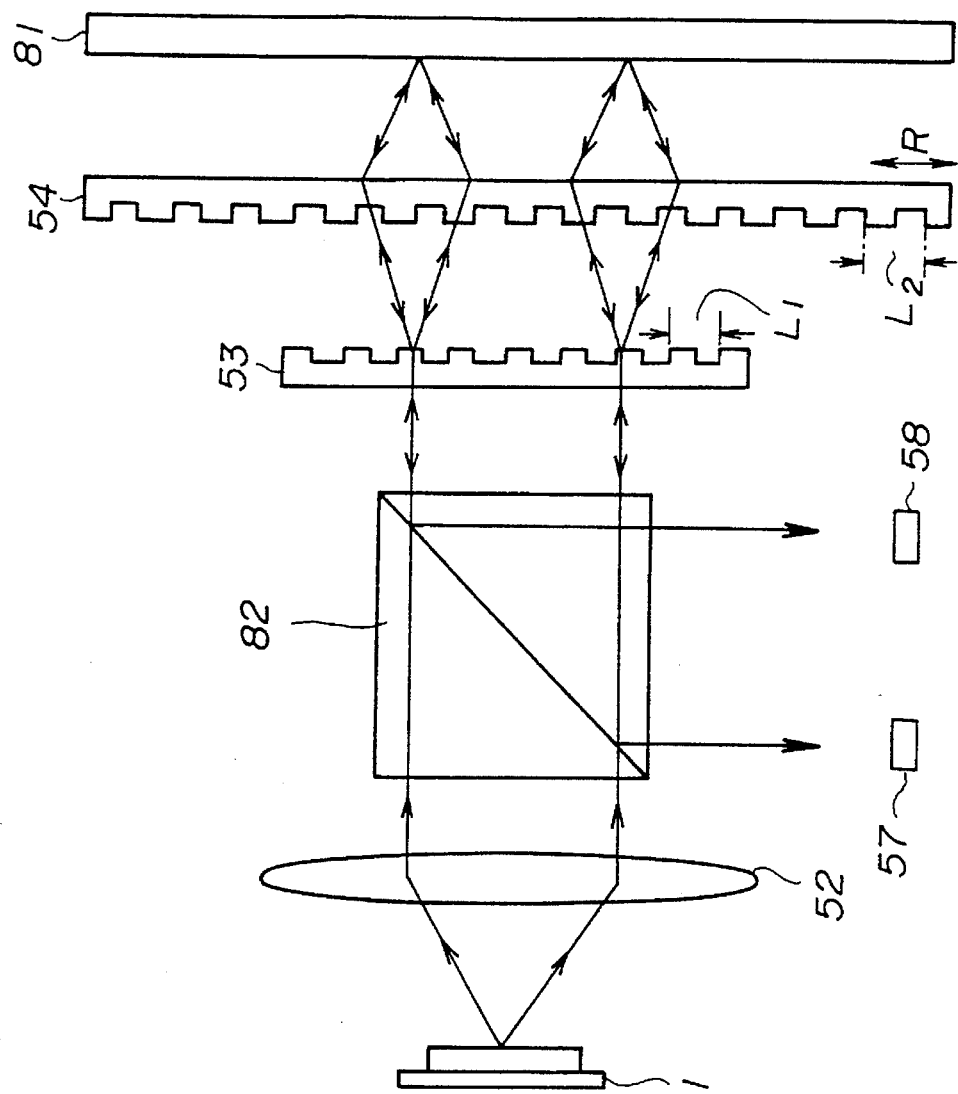
FIG. 14 is a diagram showing a fourth embodiment of the encoding apparatus according to the present invention.

The encoding apparatus in FIG. 14 includes the light source 1, the collimator lens 52, the first diffraction grating 53, the second diffraction grating 54, the two photodetectors 57 and 58, a reflection unit 81 arranged adjacent to the second diffraction grating 54, and a beam splitting unit 82 arranged between the collimator lens 52 and the first diffraction grating 53.

In the encoding apparatus of the fourth embodiment in FIG. 14, either a point light source having a relatively small emission area or a light emitting diode having a relatively great emission area can be used as the light source 1.

In the encoding apparatus of the fourth embodiment in FIG. 14, each of the first and second diffraction gratings 53 and 54 is of the cross grating type shown in FIGS. 2 and 3. Similarly to the third embodiment, the first diffraction grating 53 has the x-directional grating pitch Lx1 and the y-directional grating pitch Ly1. The second diffraction grating 54 has the x-directional grating pitch Lx2 and the y-directional grating pitch Ly2. The first and second diffraction gratings 53 and 54 are arranged such that the diffraction grating surfaces of the gratings 53 and 54 are parallel to and opposed to each other. The reflection unit 81 is placed on a flat surface of the second diffraction grating 54 opposite to the diffraction grating surface. The reflection unit 81 shown in FIG. 14 is a reflective mirror unit separate from the second diffraction grating 54, but the second diffraction grating 54 with a reflective layer formed on the flat surface of the grating 54 may be used instead. The beam splitting unit 82 is placed on a flat surface of the first diffraction grating 53.

The light emitted from the light source 1 is collimated into parallel light rays by the collimator lens 52. The collimated light rays from the collimator lens 52 pass through the beam splitting unit 82, and enter the first diffraction grating 53. The first diffraction grating 53 produces several first-occurrence diffracted light rays of four diffraction directions in response to the light rays from the collimator lens 52.

Since the first-occurrence diffracted light rays from the first diffraction grating 53 enter the second diffraction grating 53, the second diffraction grating 54 produces several second-occurrence diffracted light rays of four diffraction directions. These second-occurrence diffracted light rays are reflected from the reflection unit 81 back to the second diffraction grating 54. The third-occurrence diffracted light rays are produced from the second diffraction grating 54 and enter the first diffraction grating 53 again. The fourth-occurrence diffracted light rays are produced from the first diffraction grating 53 and enter the beam splitting unit 82.

The beam splitting unit 82 reflects the fourth-occurrence diffracted light rays from the first diffraction grating 53 to the photodetectors 57 and 58 respectively. As the result of the light interference between the two diffracted light rays reflected from the beam splitting unit 83, the first and second interference light rays enter the photodetectors 57 and 58. Similarly to the third embodiment, the interference fringes due to the first interference light ray with respect to the x direction appear at the photodetector 57, and the interference fringes due to the second interference light ray with respect to the y direction appear at the photodetector 58. The interference fringes of the two kinds are independently produced from the two diffracted light rays under the same principle.

The photodetector 57 detects a phase change of the above described first interference light when an object fixed to at least one of the first diffraction grating 53 and the second diffraction grating 54 is relatively moved within the x–y plane. The photodetector 58 detects a phase change of the above described second interference light when the object (fixed to at least one of the first diffraction grating 53 and the second diffraction grating 54) is relatively moved within the x–y plane.

Figure 15:
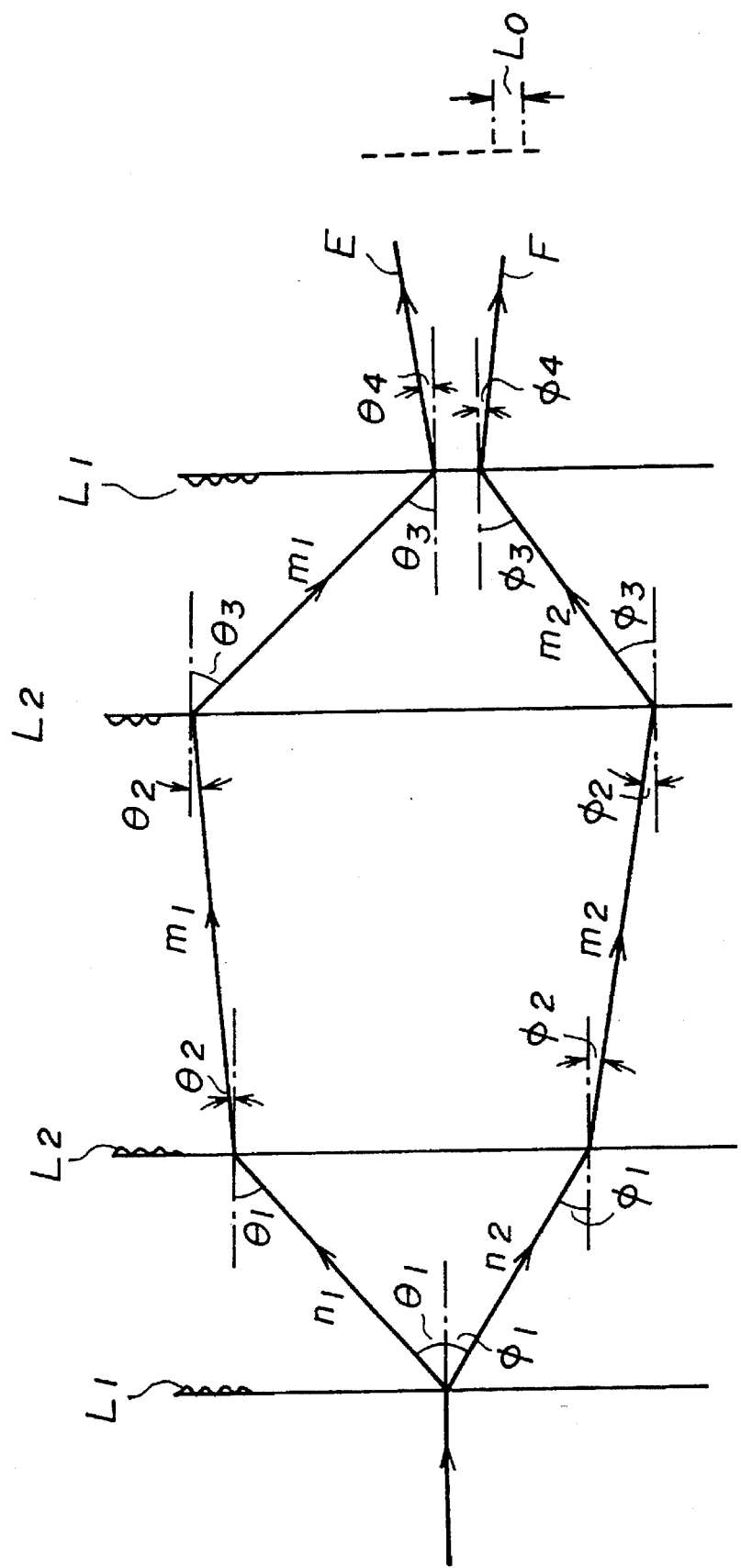
FIG. 15 is a diagram for explaining the operation of the encoding apparatus in FIG. 14.

FIG. 15 shows the operation of the encoding apparatus in FIG. 14. Similarly to the third embodiment previously described, the production of the interference fringes with respect to only one direction (either the x direction or the y direction) from two diffracted light rays E and F will be described here.

In FIG. 15, a first-occurrence n1-th order diffracted light ray with a diffraction angle $\Phi 1$ is produced from the first diffraction grating 53, and a second-occurrence m1-th order diffracted light ray with a diffraction angle $\Theta 2$ is produced from the second diffraction grating 54. By means of the reflection unit 81, a third-occurrence m1-th order diffracted light ray with a diffraction angle $\Theta 3$ is produced from the second diffraction grating 54, and a fourth-occurrence n1-th order diffracted light ray with a diffraction angle $\Theta 4$ is further produced from the first diffraction grating 53. This fourth-occurrence diffracted light ray is the diffracted light ray E, and it is reflected from the beam splitting unit 82 to one of the photodetectors 57 and 58.

On the other hand, in FIG. 15, a first-occurrence n2-th order diffracted light ray with a diffraction angle $\Phi 1$ is produced from the first diffraction grating 53, and a second-occurrence m2-th order diffracted light ray with a diffraction angle $\Phi 2$ is produced from the second diffraction grating 54. By means of the reflection unit 81, a third-occurrence m2-th order diffracted light ray with a diffraction angle $\Phi 3$ is produced from the second diffraction grating 54, and a fourth-occurrence n2-th order diffracted light ray with a diffraction angle $\Phi 4$ is further produced from the first diffraction grating 53. This fourth-occurrence diffracted light ray is the diffracted light ray F, and it is reflected from the beam splitting unit 82 to the photodetector that is the same as the diffracted light ray E.

With respect to the diffracted light ray E, $$\sin \Theta 1 = n1 \cdot 1/L1$$

$$\sin \Theta 1 - \sin \Theta 2 = m1 \cdot 1/L2$$

$$\sin \Theta 2 + \sin \Theta 3 = m1 \cdot 1/L2$$

$$\sin \Theta 3 + \sin \Theta 4 = n1 \cdot 1/L1 \tag{13}$$

where "1" indicates the wavelength of the light emitted from the light source, "L1" indicates the grating pitch of the first diffraction grating, and "L2" indicates the grating pitch of the second diffraction grating.

From the above formulas (13), $$\sin \Theta 4 = 2 1 \cdot (n1/L1 - m1/L2). \tag{14}$$

Similarly, with respect to the diffracted light ray F, $$\sin \Phi 4 = -2 1 \cdot (n2/L1 - m2/L2). \tag{15}$$

The pitch L0 of the interference fringes is represented by, $$L0 = 1/(\sin \Theta 4 + \sin \Phi 4). \tag{16}$$

Thus, from the above formulas (14), (15) and (16), $$L0 = 1/[2((n1-n2)/L1 - (m1-m2)/L2)]. \tag{17}$$

From the formula (17), it is apparent that the pitch L0 of the interference fringes is determined depending on the grating pitches L1 and L2 of the diffraction gratings 53 and 54, and that the pitch L0 is not in connection with the wavelength of the light emitted from the light source. Therefore, by means of the two diffraction gratings used by the fourth embodiment, it is possible to make accurate measurements of a two-dimensional displacement of an object without lowering the sensitivity even when the wavelength of the incident light from the light source varies.

The pitch Lv0 of the interference fringes with respect to one direction v (which indicates either the x direction or the y direction) produced from the two diffracted light rays E and F is represented by $$Lv0=|1/[2((nv1-nv2)/Lv1-(mv1-mv2)/Lv2]| \quad (18)$$

As described above, the pitch Lv0 of the interference fringes is not dependent on the wavelength of the light emitted from the light source. The interference fringes at the photodetector is moved in accordance with the relative movement of the diffraction grating to the light source. By making use of a photodetector whose size is smaller than the pitch of the interference fringes with respect to one direction, it is possible to obtain the sine signal waves output from that photodetector. In addition, since the light rays are diffracted twice at each of the first and second diffraction gratings 53 and 54 by means of the reflection unit 81, the period of the sine signal output from the photodetector when a phase change of the interference light is detected, is in proportion with twice the difference between the diffraction order numbers of the diffraction grating which is relatively moved within the x-y plane.

In addition, the sensitivity of the encoding apparatus of the fourth embodiment described above is four times as high as the sensitivity of the third embodiment previously described, as the light rays are diffracted twice at each of the first and second diffraction gratings 53 and 54 in the fourth embodiment.

Figure 17:
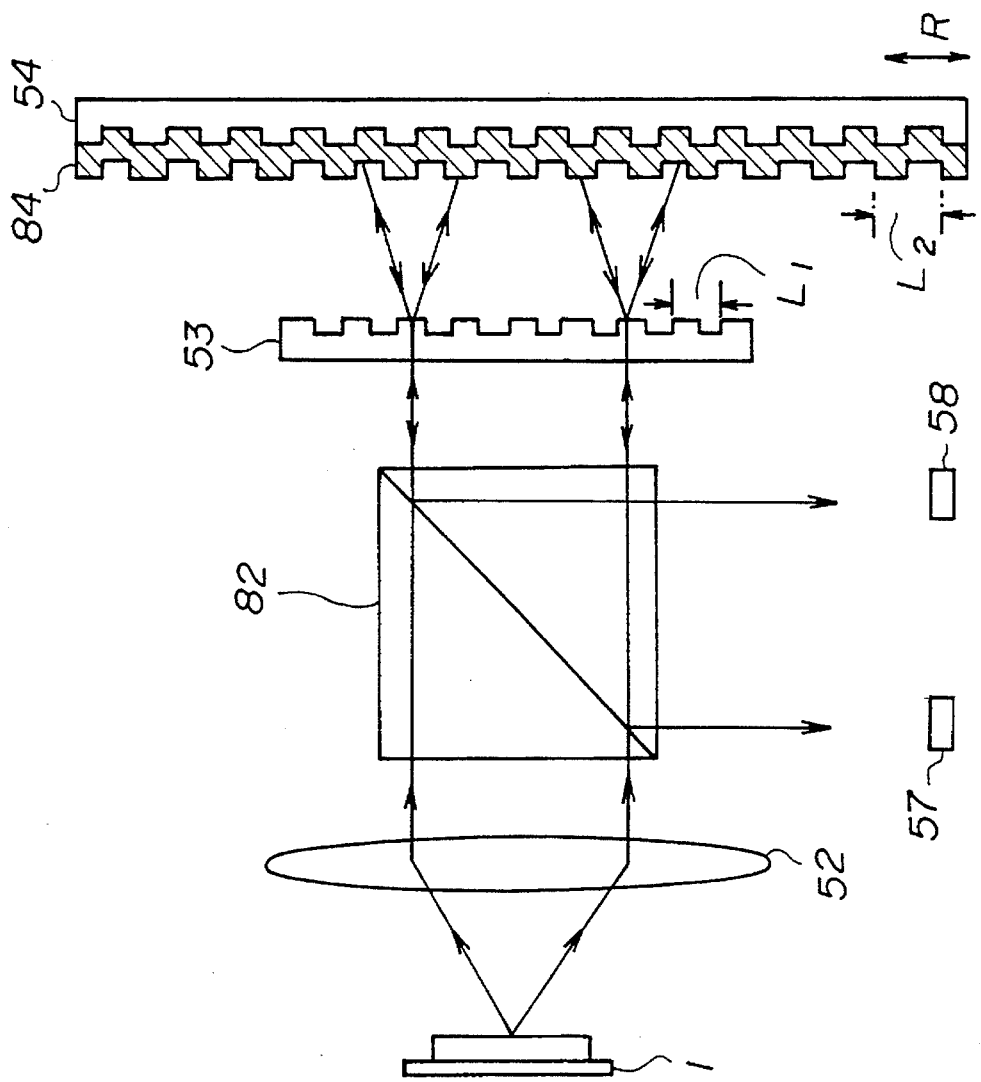
FIG. 17 is a diagram showing a modification of the encoding apparatus shown in FIG. 14.

FIG. 17 shows a modification of the encoding apparatus of the fourth embodiment in FIG. 14. The encoding apparatus shown in FIG. 17 includes the light source 1, the collimator lens 52, the beam splitting unit 82, the first diffraction grating 53, the second diffraction grating 54, the two photodetectors 57 and 58, and a reflective metal layer 84 formed on the diffraction grating surface of the second diffraction grating 54. In the encoding apparatus in FIG. 17, the second diffraction grating 54 is a reflection type diffraction grating which is similar to the reflection type diffraction grating 20 in FIG. 10.

In FIG. 17, each of the first diffraction grating 53 and the second diffraction grating 54 is of the cross grating type including a number of fine grating recesses orthogonally arranged in columns and rows in the diffraction grating surface. As described above, the second diffraction grating 54 is a reflection type diffraction grating including the reflective metal layer 84 formed on the diffraction grating surface of the grating 54. This reflective metal layer 84 can be produced on the diffraction grating surface by evaporation or sputtering of a suitable metal material, preferably aluminum.

The first diffraction grating 53 has a grating pitch L1 of the grating recesses, and the second diffraction grating 54 has a grating pitch L2 of the grating recesses. In the encoding apparatus in FIG. 17, the grating pitch L2 of the second diffraction grating 54 is approximately half the grating pitch L1 of the first diffraction grating 53. The other matters of the component units of the encoding apparatus in FIG. 17 is the same as that of the encoding apparatus of the fourth embodiment in FIG. 14.

By making use of the reflective metal layer 84 in the encoding apparatus in FIG. 17, the light rays from the collimator lens 52 are subjected to the diffraction of the first diffraction grating 53 two times and they are subjected to the diffraction of the second diffraction grating 54 once. In the manner similar to the above described fourth embodiment, the pitch L0 of the interference fringes produced from the diffracted light rays at each of the photodetectors 57 and 58 can be represented as follows:

$$L0=1/[2(n1-n2)/L1-(m1-m2)/L2] \quad (19)$$

The pitch Lv0 of the interference fringes with respect to one direction v (which indicates either the x direction or the y direction) produced from the two diffracted light rays is represented by $$Lv0=|1/[2(nv1-nv2)/Lv1-(mv1-mv2)/Lv2]| \quad (20)$$

The above formula (19) can be derived from the formula (17) in the following manner. By substituting +1, −1, +1 and −1 into the diffraction order numbers n1, n2, m1 and m2 of the formula (17), $$\begin{aligned} Lv0 &= 1/[2(2/L1 - 2/L2)] \\ &= 1/[4(1/L1 - 1/L2)] \\ &= 1/\{2[2/L1 - 1/(L2/2)]\} \end{aligned} \quad (21)$$

If the above formula (21) is compared with a formula modified from the formula (19) by substituting +1, −1, +1 and −1 into the diffraction order numbers n1, n2, m1 and m2 of the formula (19), the "2/L1" and "L2/2" in the formula (21) are substituted by "1/L1" and "L2" in the modified formula, respectively. This means that the light rays are diffracted twice from the diffraction grating 53 having the grating pitch L1, and they are diffracted once from the diffraction grating 53 having the grating pitch (L2/2). Similarly to the above manner, the above formula (20) can be derived from the formula (18).

In the modification of the encoding apparatus shown in FIG. 17, the grating pitch of the second diffraction grating 54 is approximately half the grating pitch of the first diffraction grating 53. When the diffraction grating 53 is relatively moved by one grating pitch, the period of the sine signal output from the photodetector is in proportion with two times the difference between the n1 and n2 of the diffraction gratings 53. When the diffraction grating 54 is relatively moved by one grating pitch, the period of the sine signal output from the photodetector is in proportion with the difference between the m1 and m2 of the diffraction grating 54. The sensitivity of the encoding apparatus of the fourth embodiment is unchanged when either the diffraction grating 53 or the diffraction grating 54 is moved relative to the light source, and the sensitivity of the fourth embodiment becomes four times as high as that of the third embodiment in FIG. 12.

Next, a description will be given, with reference to FIG. 18, of a fifth embodiment of the encoding apparatus according to the present invention. In the encoding apparatus in FIG. 18, a third diffraction grating 86 of the cross grating type is further provided between the second diffraction grating 54 and the reflection unit 81, and the other units are the same as those of the fourth embodiment shown in FIG. 14. The third diffraction grating 86 has an x-directional grating pitch Lx3 and a y-directional grating pitch Ly3.

Figure 18:
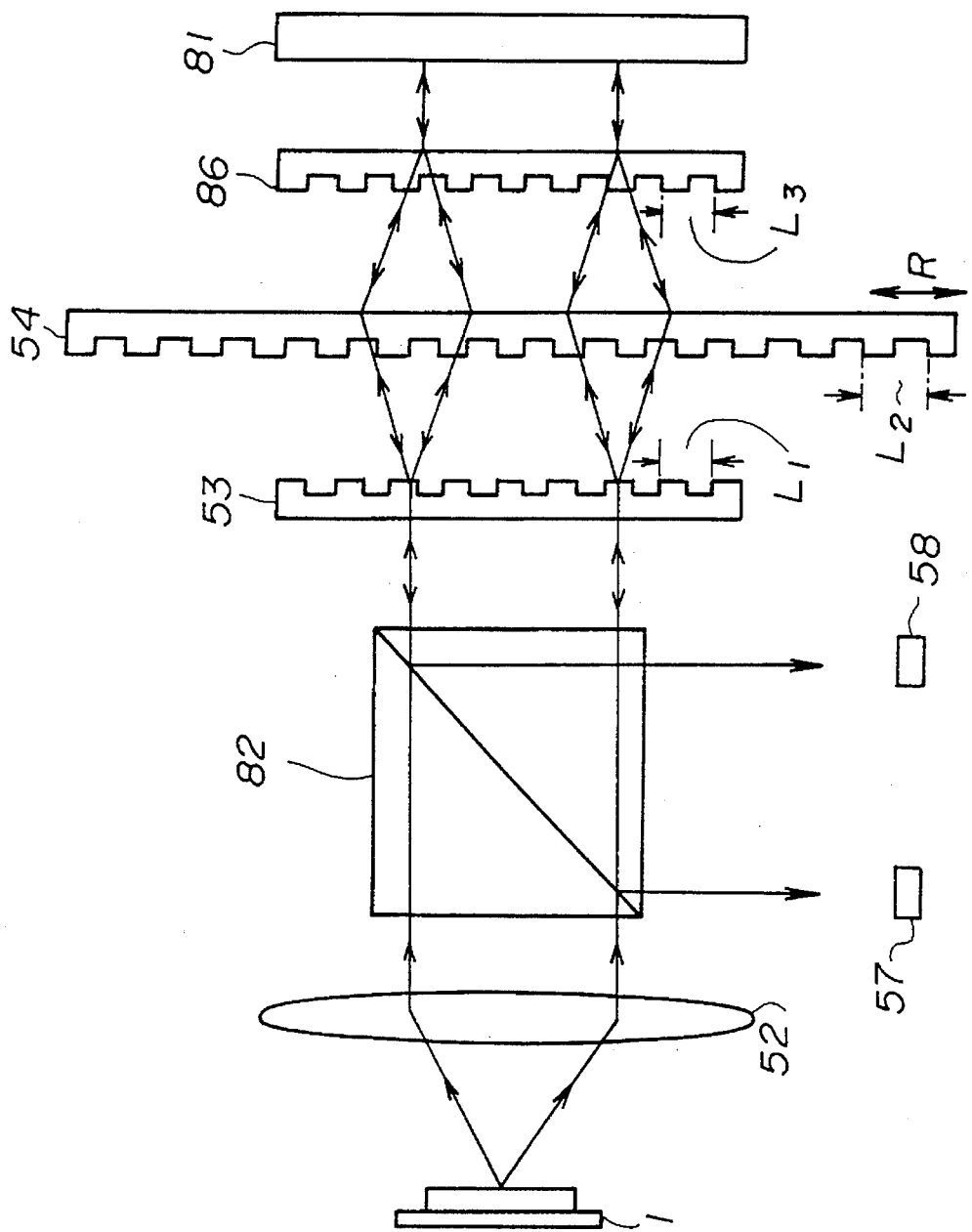
FIG. 18 is a diagram showing a fifth embodiment of the encoding apparatus according to the present invention.

The encoding apparatus shown in FIG. 18 includes the first through third diffraction gratings 53, 54 and 86, and at least one of the three diffraction gratings is relatively moved within the x-y plane and the other ones are fixed when a two-dimensional displacement of an object is measured.

Figure 19:
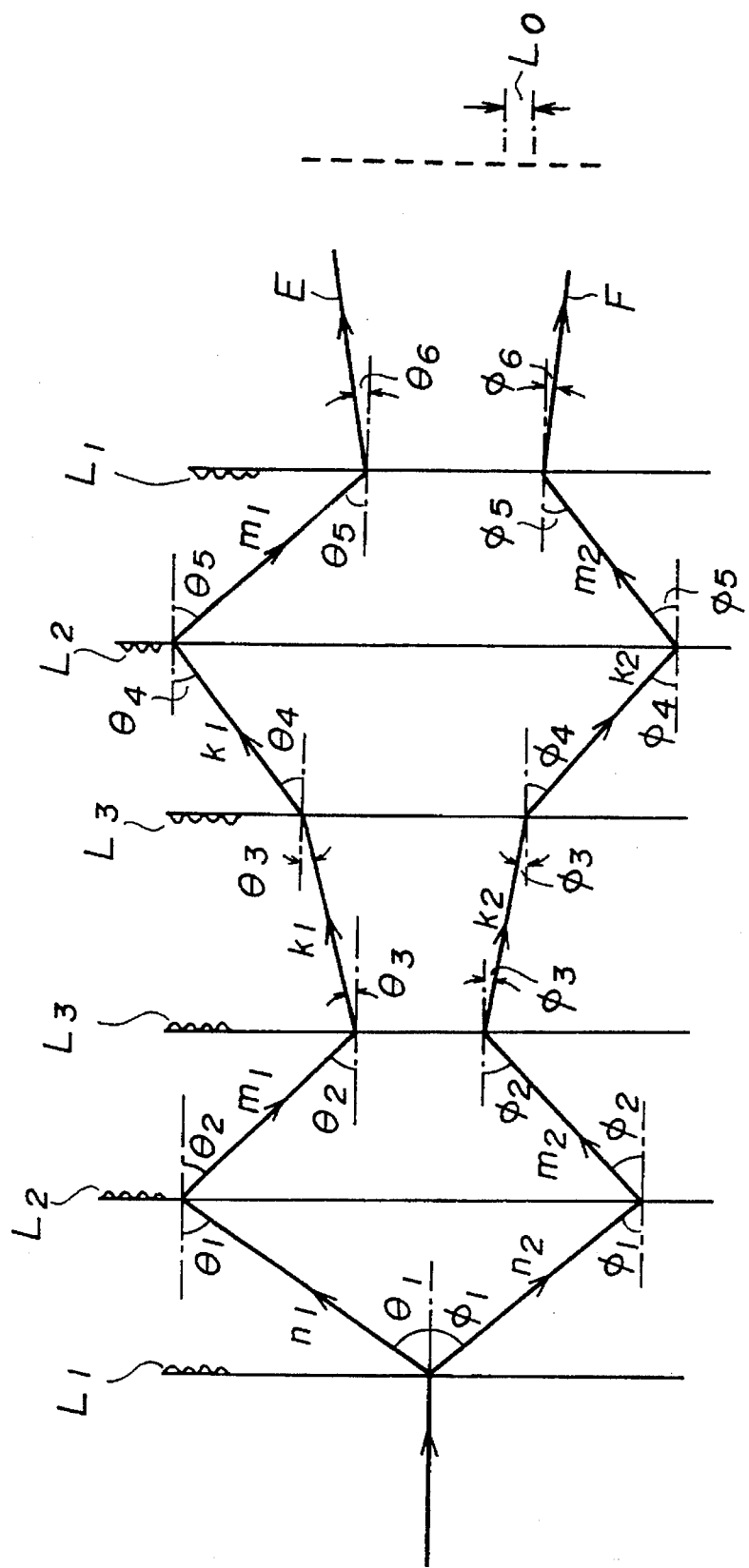
FIG. 19 is a diagram for explaining the operation of the encoding apparatus in FIG. 18.

FIG. 19 shows the operation of the encoding apparatus shown in FIG. 18. As the light emitted from the light source 1 in the encoding apparatus in FIG. 18 is diffracted twice at each of the diffraction gratings 53, 54 and 86 by means of the reflection unit 81, the optical system of the encoding apparatus of the fifth embodiment in FIG. 19 is equivalent to an optical system shown in FIG. 19.

Similarly to the fourth embodiment previously described, the production of the interference fringes with respect to only one direction (either the x direction or the y direction) from two diffracted light rays E and F will be described here.

In FIG. 19, with respect to the production of the diffracted light ray E from the incident light, a first-occurrence n1-th order diffracted light ray with a diffraction angle Θ1 is produced from the first diffraction grating 53, a second-occurrence m1-th order diffracted light ray with a diffraction angle Θ2 is produced from the second diffraction grating 54, and a third-occurrence k1-th order diffracted light ray with a diffraction angle Θ3 is produced from the third diffraction grating 86. By means of the reflection unit 81, a fourth-occurrence k1-th order diffracted light ray with a diffraction angle Θ4 is produced from the third diffraction grating 86, a fifth-occurrence m1-th order diffracted light ray with a diffraction angle Θ5 is produced from the second diffraction grating 54, and a sixth-occurrence n1-th order diffracted light ray with a diffraction angle Θ6 is produced from the first diffraction grating 53. This sixth-occurrence diffracted light ray becomes the diffracted light ray E, and it is reflected from the beam splitting unit 82 to one of the photodetectors 57 and 58.

On the other hand, in FIG. 19, with respect to the production of the diffracted light ray F from the incident light, a first-occurrence n2-th order diffracted light ray with a diffraction angle Φ1 is produced from the first diffraction grating 53, a second-occurrence m2-th order diffracted light ray with a diffraction angle Φ2 is produced from the second diffraction grating 54, and a third-occurrence k2-th order diffracted light ray with a diffraction angle Φ3 is produced from the third diffraction grating 86. By means of the reflection unit 81, a fourth-occurrence k2-th order diffracted light ray with a diffraction angle Φ4 is produced from the third diffraction grating 86, a fifth-occurrence m2-th order diffracted light ray with a diffraction angle Φ5 is produced from the second diffraction grating 54, and a sixth-occurrence n2-th order diffracted light ray with a diffraction angle Φ6 is produced from the first diffraction grating 53. This sixth-occurrence diffracted light ray becomes the diffracted light ray F, and it is reflected from the beam splitting unit 82 to the photodetector that is the same as the diffracted light ray E.

With respect to the diffracted light ray E, $$\sin \Theta 1 = n1 \cdot l/L1$$

$$\sin \Theta 1 + \sin \Theta 2 = m1 \cdot l/L2$$

$$\sin \Theta 2 + \sin \Theta 3 = k1 \cdot l/L3$$

$$-\sin \Theta 3 + \sin \Theta 4 = k1 \cdot l/L3$$

$$\sin \Theta 4 + \sin \Theta 5 = m1 \cdot l/L2$$

$$\sin \Theta 5 + \sin \Theta 6 = n1 \cdot l/L1 \tag{22}$$

where "l" indicates the wavelength of the light emitted from the light source, "L1" indicates the grating pitch of the first diffraction grating, "L2" indicates the grating pitch of the second diffraction grating, and "L3" indicates the grating pitch of the third diffraction grating.

From the above formulas (22), $$\sin \Theta 6 = 2l \cdot (n1/L1 - m1/L2 + k1/L5). \tag{23}$$

Similarly, with respect to the diffracted light ray F, $$\sin \Phi 6 = -2l \cdot (n2/L1 - m2/L2 + k2/L5) \tag{24}$$

The pitch L0 of the interference fringes is represented by, $$L0 = l/(\sin \Theta 6 + \sin \Phi 6). \tag{25}$$

Thus, from the above formulas, $$L0 = 1/[2((n1-n2)/L1 - (m1-m2)/L2 + (k1-k2)/L3)]. \tag{26}$$

From the formula (26), it is apparent that the pitch L0 of the interference fringes is determined depending on the grating pitches L1, L2 and L3 of the three diffraction gratings, and that the pitch L0 is not in connection with the wavelength of the light emitted from the light source. Therefore, by means of the three diffraction gratings used by the fifth embodiment, it is possible to make accurate measurements of a two-dimensional displacement of an object without lowering the sensitivity even when the wavelength of the incident light from the light source varies.

The pitch Lv0 of the interference fringes with respect to one direction v (which indicates either the x direction or the y direction) produced from the two diffracted light rays E and F is represented by $$Lv0 = |1/[2((nv1-nv2)/Lv1 - (mv1-mv2)/Lv2 + (kv1-kv2)/Lv3)]| \tag{27}$$

As described above, the pitch Lv0 is not dependent on the wavelength of the light emitted from the light source. The interference fringes at the photodetector is moved in accordance with the movement of the diffraction grating within the x–y plane relative to the light source. By making use of a photodetector whose size is smaller than the pitch of the interference fringes with respect to one direction, it is possible to obtain the sine signal waves output from that photodetector. In addition, since the light rays are diffracted twice at each of the first, second and third diffraction gratings 53, 54 and 86 by means of the reflection unit 81, the period of the sine signal output from the photodetector when a phase change of the interference light is detected is in proportion with twice the difference (its absolute value) between the diffraction order numbers (|m1−m2|, |n1−n2|, or |k1−k2|) of the two diffraction gratings one of which is relatively moved within the x–y plane.

In addition, the sensitivity of the encoding apparatus of the fifth embodiment described above is four times as high as the sensitivity of the third embodiment previously described, as the light rays are diffracted twice at each of the first, second and third diffraction gratings 53, 54 and 86 in the fifth embodiment. Also, in the fifth embodiment described above, not only a point light source but also a light emitting diode may be used as the light source 1 of the encoding apparatus of the present invention.

Figure 20:
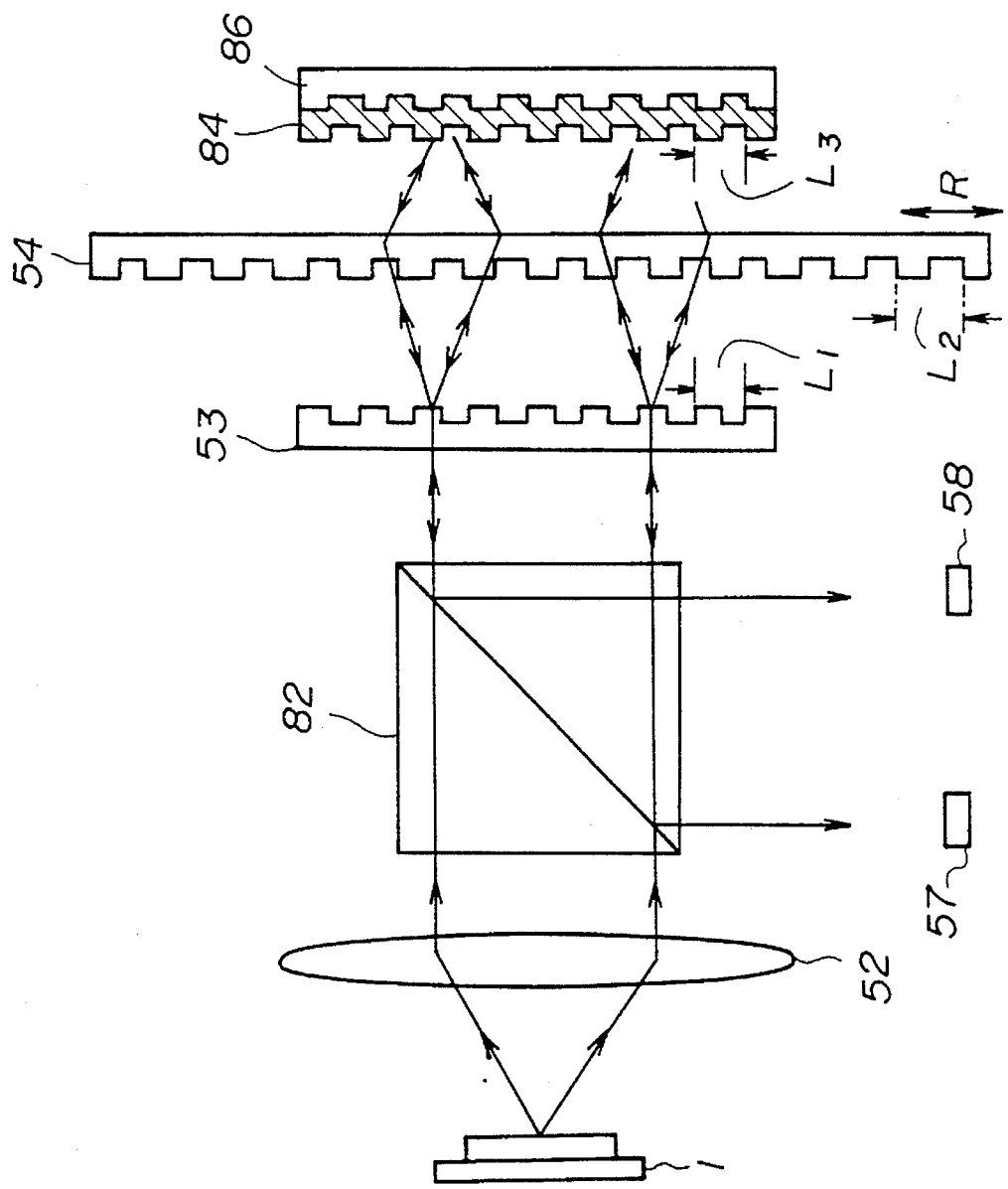
FIG. 20 is a diagram showing a modification of the encoding apparatus shown in FIG. 18.

FIG. 20 shows a modification of the encoding apparatus of the fifth embodiment in FIG. 18. The encoding apparatus shown in FIG. 20 is similar to the encoding apparatus shown in FIG. 17.

The encoding apparatus shown in FIG. 20 includes the light source 1, the collimator lens 52, the beam splitting unit 82, the first diffraction grating 53, the second diffraction grating 54, the three photodetectors 57, 58 and 86, and a reflective metal layer 84 on the diffraction grating surface of the third diffraction grating 86. In the encoding apparatus in FIG. 20, the third diffraction grating 86 is a reflection type diffraction grating which is similar to the reflection type diffraction grating 20 in FIG. 10.

In the encoding apparatus in FIG. 20, each of the three diffraction gratings 53, 54 and 86 is of the cross grating type including a number of fine grating recesses orthogonally arranged in columns and rows in the diffraction grating surface. As described above, the second diffraction grating 86 is a reflection type diffraction grating including the reflective metal layer 84 formed on the diffraction grating surface of the grating 86. This reflective metal layer 84 can be produced on the diffraction grating surface by evaporation or sputtering of a suitable metal material, preferably aluminum.

In the encoding apparatus in FIG. 20, the first diffraction grating 53 has the grating pitch L1, the second diffraction grating 54 has the grating pitch L2, and the third diffraction grating 86 has a grating pitch L3. In the encoding apparatus in FIG. 20, the grating pitch L3 of the third diffraction grating 86 is approximately half the grating pitch L1 or L2 of the first or second diffraction grating 53 or 54. The other matters of the encoding apparatus in FIG. 20 is the same as those of the encoding apparatus of the fifth embodiment in FIG. 17.

By making use of the reflective metal layer 84 in the encoding apparatus in FIG. 20, the light rays from the collimator lens 52 are subjected to the diffraction of each of the first and second diffraction gratings 53 and 54 two times and they are subjected to the diffraction of the third diffraction grating 86 once. The pitch L0 of the interference fringes produced from the diffracted light rays at each of the photodetectors 57 and 58 can be represented as follows:

$$L0=1/[2((n1-n2)/L1-(m1-m2)/L2+(k1-k2)/L3)] \quad (28)$$

The pitch Lv0 of the interference fringes with respect to one direction v (which indicates either the x direction or the y direction) produced from the two diffracted light rays is represented by $$Lv0=|1/[2((nv1-nv2)/Lv1-(mv1-mv2)/Lv2+(kv1-kv2)/Lv3]|. \quad (29)$$

The above formula (28) can be derived from the formula (26) in the following manner. By substituting +1, −1, +1, −1, +1 and −1 into the diffraction order numbers n1, n2, m1, m2, k1 and k2 of the formula (26), $$L0=1/[4(1/L1-1/L2-1/L3)]=1/\{2[2/L1-2/L2+1/(L3/2)]\} \quad (30)$$

If the above formula (28) is compared with a formula modified from the formula (26) by substituting +1, −1, +1, −1, +1 and −1 into the diffraction order numbers n1, n2, m1, m2, k1 and k2 of the formula (26), the "2/L1", "2/L2" and "L3/2" in the formula (28) are substituted by "1/L1", "1/L2" and "L3" in the modified formula, respectively. This means that the light rays are diffracted twice from the diffraction gratings 53 and 54 having the grating pitches L1 and L2, and they are diffracted once from the diffraction grating 86 having the grating pitch (L3/2). Similarly to the above manner, the above formula (29) can be derived from the formula (27).

In the encoding apparatus shown in FIG. 18 or 20, three diffraction gratings are provided. It is a matter of course that four or more diffraction gratings may be provided in the encoding apparatus according to the present invention.

As described above, the pitch of the interference fringes is not dependent on the wavelength of the incident light emitted from the light source. However, when the higher order diffracted light rays are used for making measurements of a two-dimensional displacement of an object, the phase of the interference fringes is dependent on the wavelength of the incident light. In the encoding apparatus according to the present invention, the dependency of the phase of the interference fringes on the incident light can be canceled by suitably selecting the diffraction order numbers of the diffraction gratings.

In order to cancel the dependency of the phase of the interference fringes on the incident light, it is desirable to select the diffraction order numbers of the three diffraction gratings that satisfy the requirements: n1=−n2, m1=−m2 and k1=−k2, as in the above described embodiments. In the case of the above third embodiment, one can select, for example, (±1)th order diffracted light rays of the first diffraction grating 53 and (±3)th order diffracted light rays of the second diffraction grating 54.

Some examples of the diffraction gratings in which the diffraction order numbers: n1=+1, n2=−1, m1=+1, m2=−1 are selected will be given in the following.

In the case of the encoding apparatus shown in FIG. 12, one can select the second diffraction grating 54 having a grating pitch L2 equal to 1.00025 μm, in order to make the interference fringe pitch L0 equal to 2 mm when the first diffraction grating 53 having the grating pitch L1=1 μm is used. In this example, the difference between the first diffraction grating pitch L1 and the second diffraction grating pitch L2 is equal to 0.025%, and these diffraction gratings can be suitably produced.

In the case of the encoding apparatus shown in FIG. 14, one can select the second diffraction grating 54 having a grating pitch L2 equal to 1.000125 μm, in order to make the interference fringe pitch L0 equal to 2 mm when the first diffraction grating 53 having the grating pitch L1=1 μm is used.

In the case of the encoding apparatus shown in FIG. 17, one can select the second diffraction grating 54 having a grating pitch L2 equal to 0.5000625 μm, in order to make the interference fringe pitch L0 equal to 2 mm when the first diffraction grating 53 having the grating pitch L1=1 μm is used.

Also, in the case of the encoding apparatus shown in FIG. 18, an example of the diffraction gratings in which the diffraction order numbers: n1=+1, n2=−1, m1=+1, m2=−1, k1=+1, k2=−1 are selected is given here. In this example, one can select the second diffraction grating 54 having a grating pitch L2 equal to 0.999875 μm, in order to make the interference fringe pitch L0 equal to 2 mm when the first diffraction grating 53 having the grating pitch L1=1 μm is used.

Next, a description will be given, with reference to FIGS. 21 through 31, of the photodetectors used by the encoding apparatus according to the present invention. More specifically, the following description relates to the increase of the quality of the sine wave signal output from the photodetectors of the encoding apparatus for making accurate measurements of a two-dimensional displacement of an object. For the sake of convenience, the photodetectors used by the encoding apparatus of the third embodiment in FIG. 12 will be described here.

Figure 21:
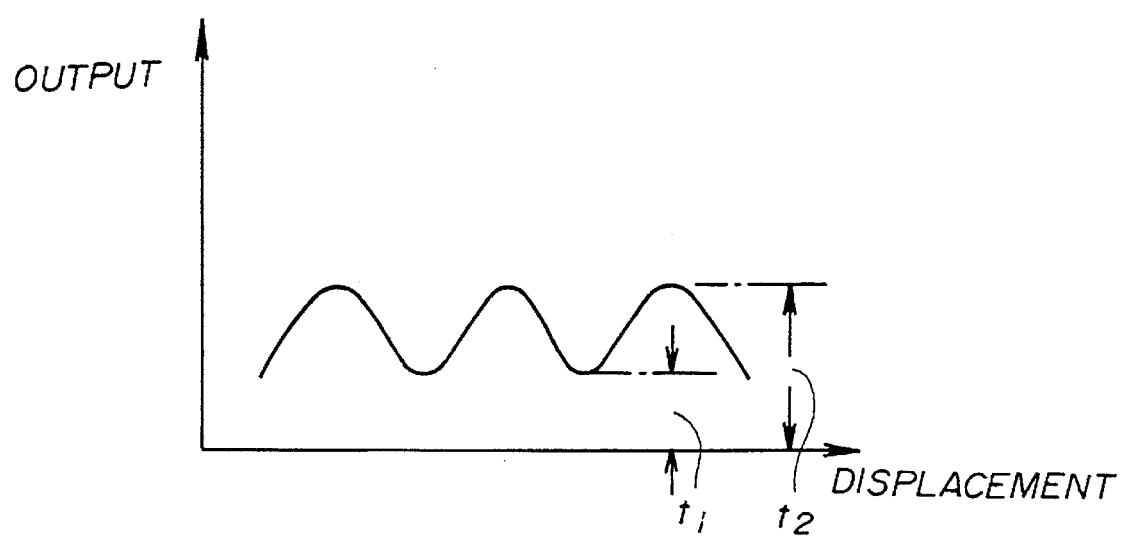
FIG. 21 is a chart showing the sine wave signal output from a photodetector of the encoding apparatus according to the present invention.

Generally, in order to output a sine wave signal when a phase change of the interference light ray is detected in accordance with the two-dimensional displacement of an object within the x–y plane, it is necessary to use photodetectors having an emission area smaller than one pitch of the interference fringes or pinholes having an inside diameter smaller than one pitch of the interference fringes, as in the above described embodiments. FIG. 21 shows the sine wave signal output from a photodetector (57 or 58) when a phase change of the interference light ray is detected by the photodetector.

The quality of the sine wave signal output from the photodetector becomes higher when the ratio of the peak of the sine wave signal to the valley thereof is greater. This ratio is called the aspect ratio, and it is indicated by the value of t2/t1 (where t1 denotes the output amplitude of the valley and t2 denotes the output amplitude of the peak as indicated in FIG. 21). In order to make precision measurements of a two-dimensional displacement of an object, it is desirable to increase the quality of the since wave signal output from the photodetector. However, as the sine wave signal normally has a bias component "t1" (as indicated in FIG. 21), the quality of the sine wave signal output from the photodetector is relatively low.

Figure 22:
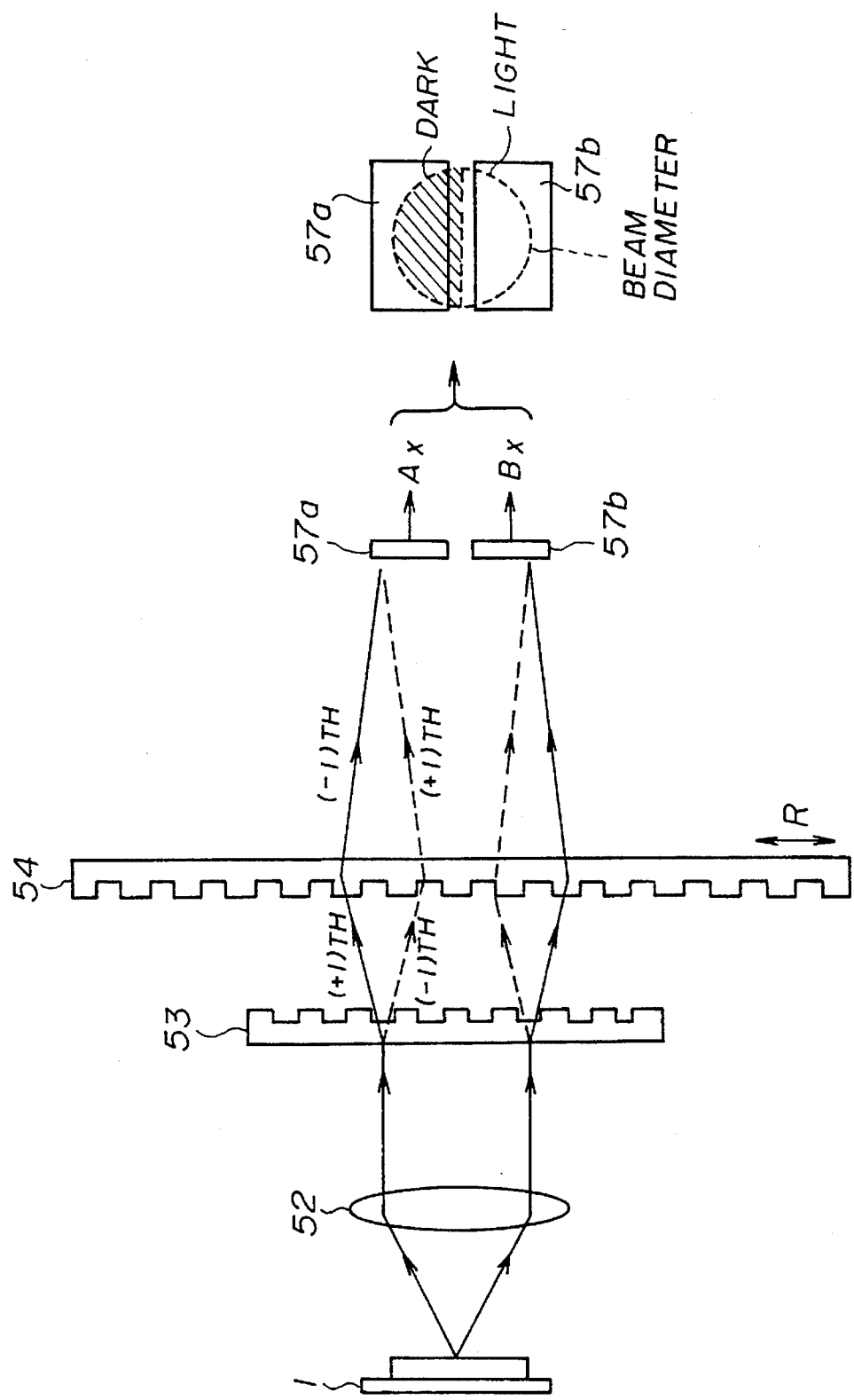
FIG. 22 is a diagram showing a modification of the encoding apparatus shown in FIG. 12.

FIG. 22 shows an arrangement of the photodetectors of the encoding apparatus for outputting the sine wave signal with higher quality. The photodetectors shown in FIG. 22 include a pair of photodetectors 57a and 57b arranged by an x-directional distance from each other, and a pair of photodetectors 58a and 58b arranged by a y-directional distance from each other. The x-directional distance between the photodetectors 57a and 57b is equal to half the x-directional pitch of the interference fringes, and the y-directional distance between the photodetectors 58a and 58b is equal to half the y-direction pitch of the interference fringes. In other words, the encoding apparatus shown in FIG. 22 uses two photodetectors for detecting the relative movement of the diffraction grating to the light source with respect to one direction while the encoding apparatus shown in FIG. 12 uses one photodetector for detecting the same. In FIG. 22, only the photodetectors 57a and 57b are shown and the photodetectors 58a and 58b are omitted for the sake of convenience.

Figure 23:
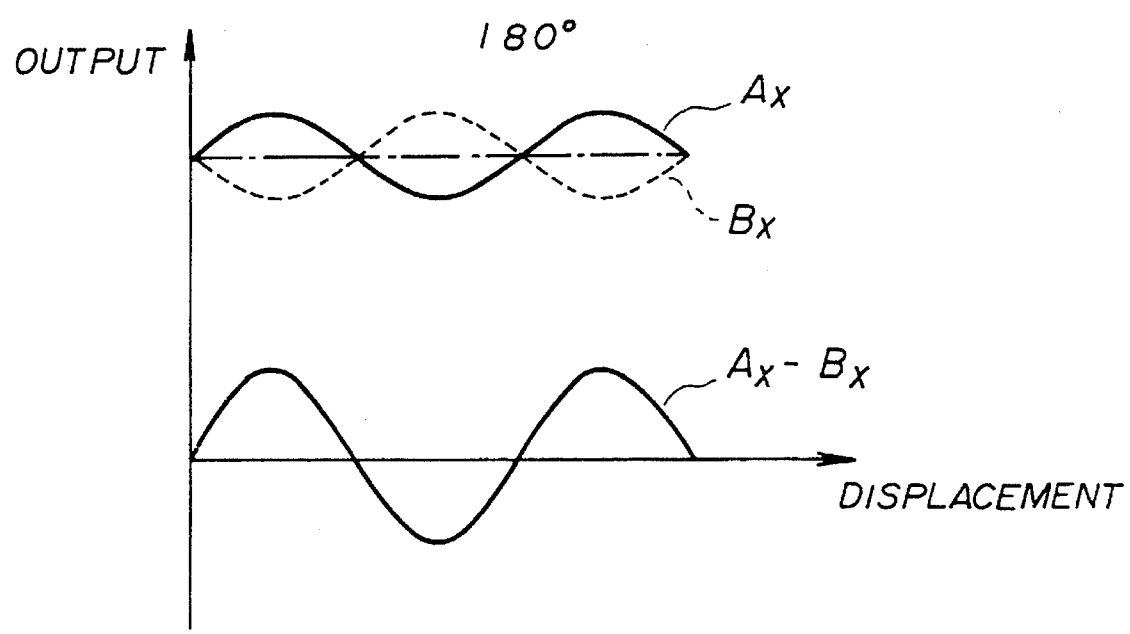
FIG. 23 is a chart showing the output signals of the photodetectors of the encoding apparatus in FIG. 22.

FIG. 23 shows the output signals of the photodetectors used by the encoding apparatus shown in FIG. 22. As the photodetectors 57a and 57b are arranged by the x-directional distance equal to half the pitch of the interference fringes, the photodetectors 57a and 57b output the two sine wave signals Ax and Bx having a phase difference of 180° shown in FIG. 23. Also, a difference signal (Ax–Bx) indicating the difference between the two sine wave signals Ax and Bx is shown in FIG. 23. As shown in FIG. 23, it is possible to eliminate the bias component "t1" of the sine wave signal by selecting the difference signal (Ax–Bx) of the two sine wave signals Ax and Bx output from the photodetectors 57a and 57b, so that the quality of the sine wave signal can be increased.

Similarly to the photodetectors 57a and 57b, it is possible to eliminate the bias component of the sine wave signal with respect to the y direction by selecting the difference signal (Ay–By) of the two sine wave signals Ay and By output from the photodetectors 58a and 58b, so that the quality of the sine wave signal with respect to the y direction can be increased.

Figure 24:
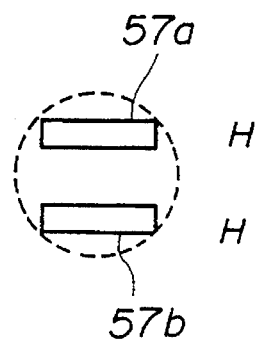
FIG. 24 is a diagram showing a modification of the photodetectors of the encoding apparatus in FIG. 22.

FIG. 24 shows a modification of the photodetectors of the encoding apparatus shown in FIG. 22 for outputting the sine wave signal with higher quality. The photodetectors shown in FIG. 24 include a pair of photodetectors 57a and 57b arranged by an x-directional distance from each other, and a pair of photodetectors 58a and 58b arranged by a y-directional distance from each other. Each of the photodetectors 57a, 57b, 58a and 58b has a width "H" smaller than the width of each of the photodetectors shown in FIG. 22. For the sake of convenience, only the photodetectors 57a and 57b with the smaller widths are shown in FIG. 24.

When the photodetectors 57a, 57b, 58a and 58b as shown in FIG. 24 are used by the encoding apparatus, the bias component "t1" of the sine wave signal can be eliminated more clearly. Also, the amplitudes of the difference signals "Ax–Bx" and "Ay–By" can be increased further. As the quality of the sine wave signal output from the photodetectors 57a, 57b, 58a and 58b is further increased, the measurements of a two-dimensional displacement of an object can be made by the encoding apparatus with higher accuracy.

However, if the width H of the photodetectors is reduced, the quantity of light detected by the photodetectors is also decreased. Thus, it is necessary to provide an encoding apparatus having a width appropriate for the applications.

Figure 25:
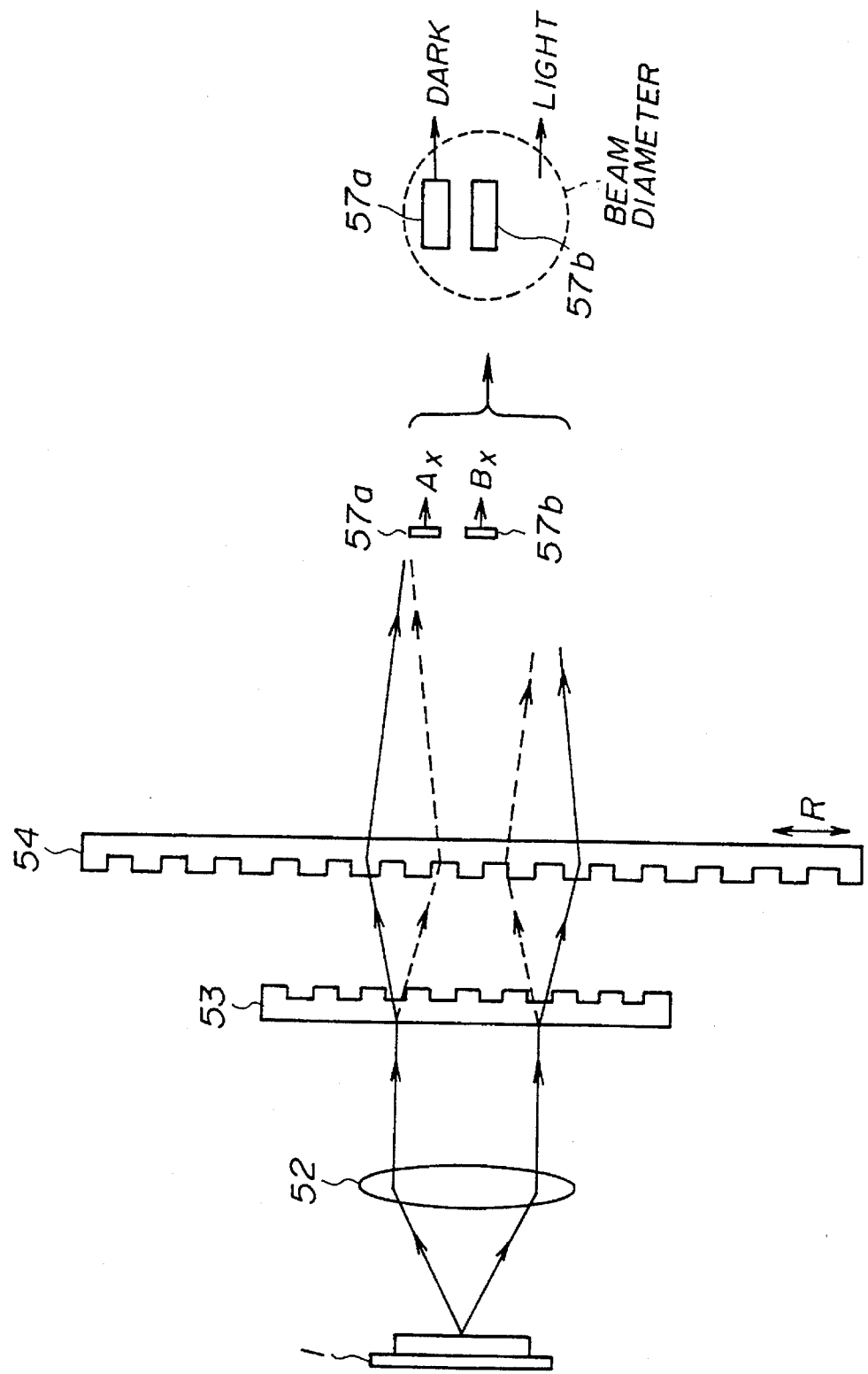
FIG. 25 is a diagram showing another modification of the photodetectors of the encoding apparatus shown in FIG. 22.

FIG. 25 shows another modification of the photodetectors of the encoding apparatus shown in FIG. 22 for outputting the sine wave signal with higher quality. The photodetectors shown in FIG. 25 include a pair of photodetectors 57a and 57b arranged by an x-directional distance from each other, and a pair of photodetectors 58a and 58b arranged by a y-directional distance from each other. The x-directional distance between the photodetectors 57a and 57b in FIG. 25 is equal to the quarter of the x-directional pitch of the interference fringes, and the y-directional distance between the photodetectors 58a and 58b (not shown in FIG. 25) is equal to a quarter of the y-directional pitch of the interference fringes. Only the photodetectors 57a and 57b are shown in FIG. 25 and the photodetectors 58a and 58b are omitted, for the sake of convenience.

Figure 26:
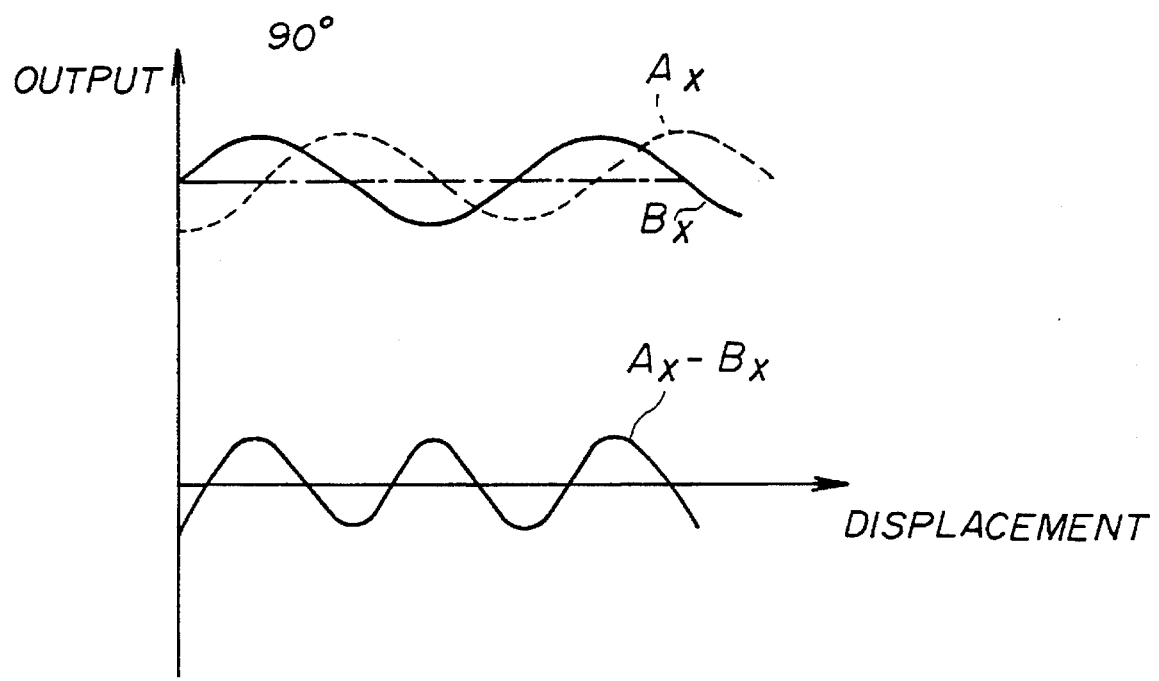
FIG. 26 is a chart showing the output signals of the photodetectors of the encoding apparatus in FIG. 25.

FIG. 26 shows the output signals of the photodetectors with respect to the x direction used by the encoding apparatus shown in FIG. 25. These photodetectors 57a and 57b have widths smaller than those of the photodetectors in FIG. 22. As the photodetectors 57a and 57b are arranged by the x-directional distance equal to the quarter of one pitch of the interference fringes, the photodetectors 57a and 57b output the two sine wave signals Ax and Bx having a phase difference of 90°. A difference signal (Ax–Bx) indicating the difference between the two sine wave signals Ax and Bx is shown in FIG. 26. This difference signal is obtained by subtracting the output signal Bx of the photodetector 57b from the output signal Ax of the photodetector 57a. It is possible to eliminate the bias component "t1" of the output signals of the photodetectors by selecting the difference signal (Ax–Bx) of the sine wave signals Ax and Bx, so that the quality of the sine wave signal can be increased.

Similarly to the photodetectors 57a and 57b, it is possible to eliminate the bias component of the sine wave signal with respect to the y direction by selecting the difference signal (Ay–By) of the two sine wave signals Ay and By output from the photodetectors 58a and 58b, so that the quality of the sine wave signal with respect to the y direction can be increased. The difference signals (Ax–Bx) and (Ay–By) obtained from the photodetectors 57a, 57b, 58a and 58b can be used to make precision measurements of a two-dimensional displacement of an object in the encoding apparatus according to the present invention.

Figure 27:
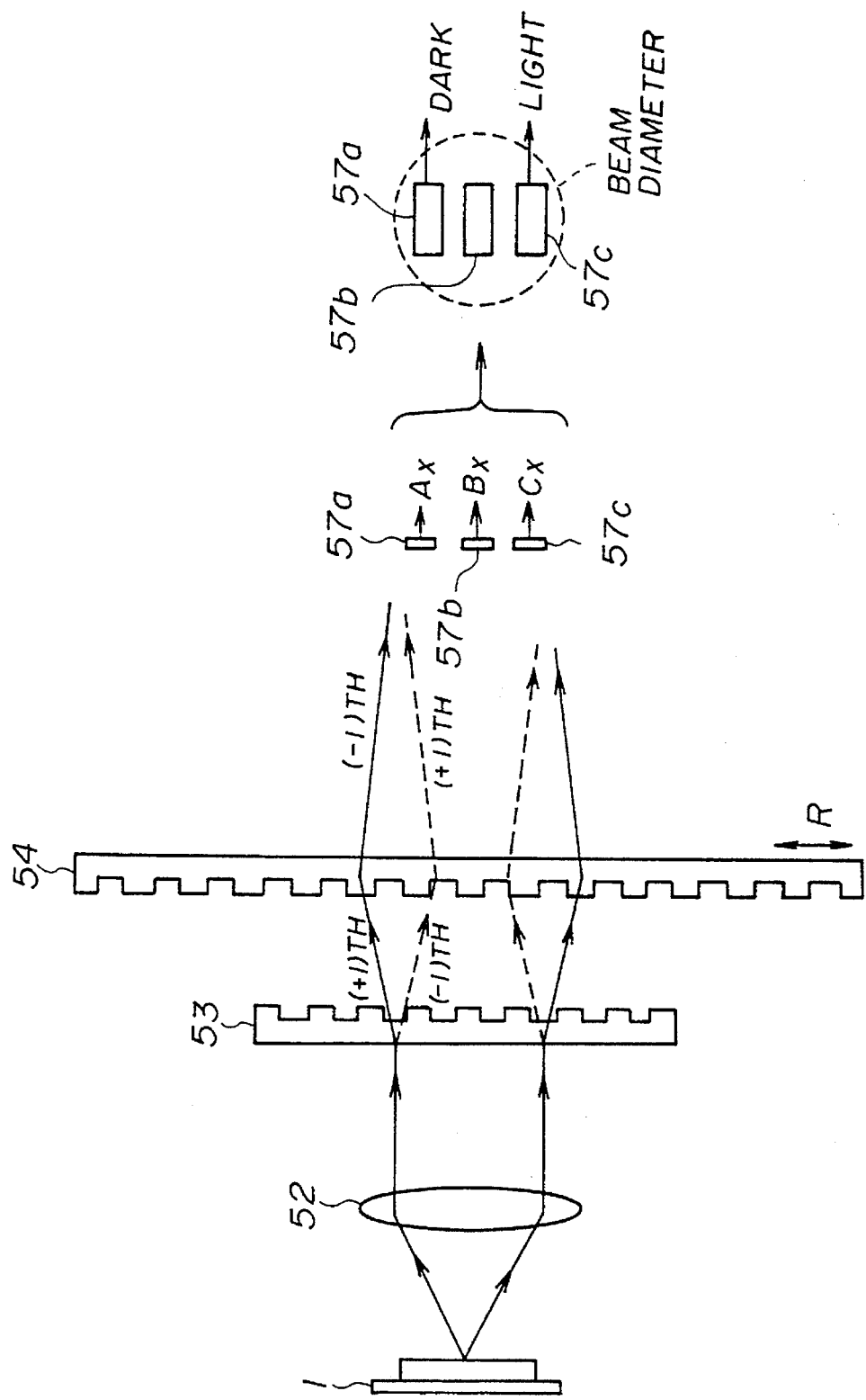
FIG. 27 is a diagram showing still another modification of the photodetectors of the encoding apparatus shown in FIG. 22.

FIG. 27 shows another modification of the photodetectors of the encoding apparatus shown in FIG. 22. The arrangement of these photodetectors in the encoding apparatus allows the outputting of the sine wave signal with still higher quality. The photodetectors in FIG. 27 include three photodetectors 57a, 57b and 57c arranged by equal x-directional distances from each other, and three photodetectors 58a, 58b and 58c (not shown in FIG. 27) arranged by equal y-directional distances from each other. The x-directional distance of the photodetectors 57a–57c is equal to a quarter of one x-directional pitch of the interference fringes, and the y-directional distance of the photodetectors 58a–58c is equal to a quarter of one y-direction pitch of the interference fringes. The encoding apparatus in FIG. 27 uses three photodetectors for detecting the relative movement of the diffraction grating to the light source with respect to one direction, and the encoding apparatus in FIG. 27 can output the sine wave signal with still higher quality so that more accurate measurements of a two-dimensional displacement of an object can be made.

Figure 28:
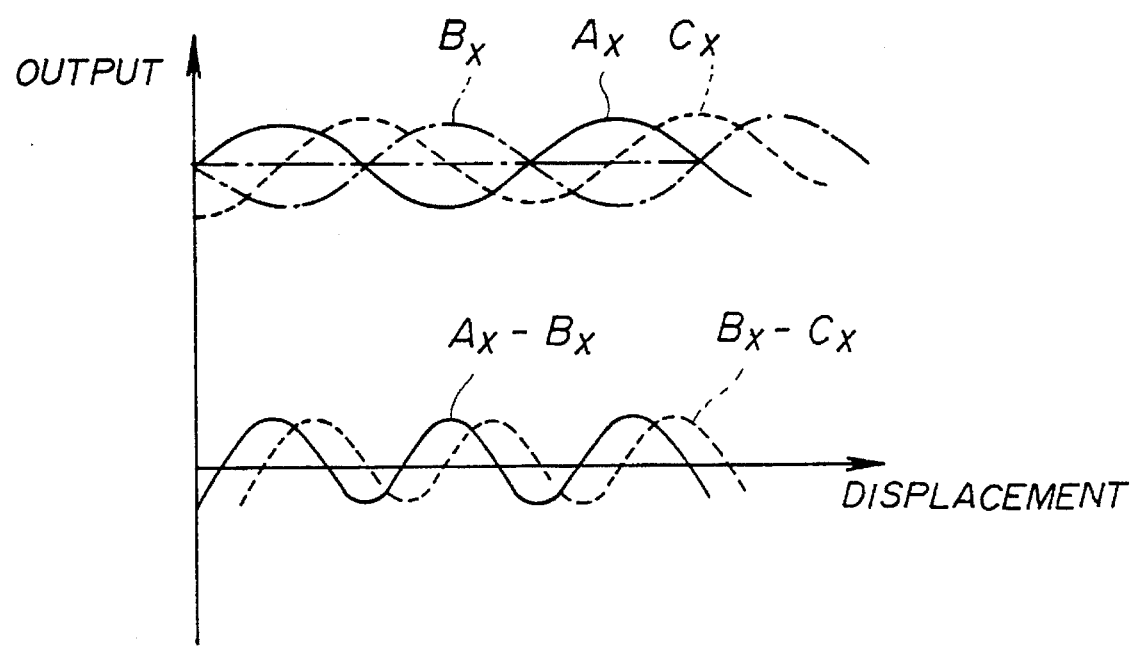
FIG. 28 is a chart showing the output signals of the photodetectors of the encoding apparatus in FIG. 27.

FIG. 28 shows the output signals of the x-directional photodetectors used by the encoding apparatus shown in FIG. 27. As the photodetectors 57a, 57b and 57c are arranged by the x-directional distances equal to a quarter of one pitch of the interference fringes, the photodetectors 57a and 57b output the two sine wave signals Ax and Bx having a phase difference of 90° and the photodetectors 57b and 57c output the two sine wave signals Bx and Cx as shown in FIG. 28. Also, a difference signal (Ax–Bx) indicating the difference between the two sine wave signals Ax and Bx and a difference signal (Bx–Cx) indicating the difference between the two sine wave signals Bx and Cx are shown in FIG. 28. It is possible to eliminate the bias component "t1" of the sine wave signal by selecting the difference signal (Ax–Bx) of the sine wave signals Ax and Bx (output from the photodetectors 57a and 57b) and the difference signal (Bx–Cx) of the sine wave signals Bx and Cx (output from the photodetectors 57b and 57c), so that the quality of the sine wave signal can be further increased. The difference signal (Ax–Bx) and the difference signal (Bx–Cx) may be used as the A-phase signal and the B-phase signal for making precision measurements of a displacement of an object, or either of the two difference signals may be used for making precision measurements of a displacement of an object.

Similarly to the photodetectors 57a–57c, it is possible to eliminate the bias component of the sine wave signal with respect to the y direction by selecting the difference signal (Ay–By) of the two sine wave signals Ay and By and the difference signal (By–Cy) of the two sine wave signals By and Cy, so that the quality of the sine wave signal with respect to the y direction can be further increased.

FIG. 29 shows still another modification of the photodetectors of the encoding apparatus shown in FIG. 22. The photodetectors in FIG. 29 include four photodetectors 57a, 57b, 57c and 57d arranged by equal x-directional distances from each other, and four photodetectors 58a, 58b, 58c and 58d (not shown in FIG. 29) arranged by equal y-directional distances from each other. The x-directional distance of the photodetectors 57a–57d is equal to a quarter of one x-directional pitch of the interference fringes, and the y-directional distance of the photodetectors 58a–58d is equal to a quarter of one y-direction pitch of the interference fringes. The encoding apparatus uses four photodetectors for detecting the relative movement of the diffraction grating to the light source with respect to one direction, and the encoding apparatus can output the sine wave signal with still higher quality so that more accurate measurements of a two-dimensional displacement of an object can be made.

Figure 30:
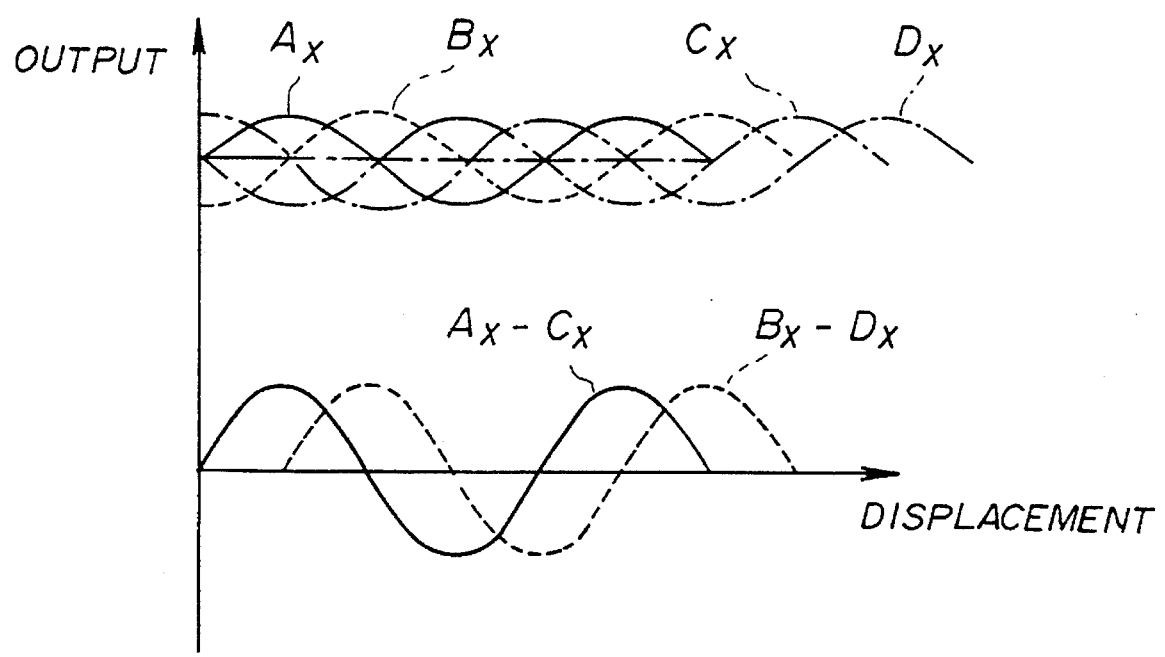
FIG. 30 is a chart showing the output signals of the photodetectors of the encoding apparatus in FIG. 29.

FIG. 30 shows the output signals of the x-directional photodetectors used by the encoding apparatus according to the present invention. As shown in FIG. 30, a difference signal (Ax–Cx) indicating the difference between the two sine wave signals Ax and Cx (output from the photodetectors 57a and 57b) and a difference signal (Bx–Dx) indicating the difference between the two sine wave signals Bx and Dx (output from the photodetectors 57b and 57d) are used to make precision measurements of the relative movement of the diffraction grating within the encoding apparatus. It is possible to eliminate the bias component "t1" of the output signals of the photodetectors, so that the quality of the sine wave signal can be increased.

Similarly to the photodetectors 57a–57d, it is possible to eliminate the bias component of the sine wave signal with respect to the y direction by using the difference signal (Ay–Cy) of the two sine wave signals Ay and Cy and the difference signal (Bx–Dx) of the two sine wave signals By and Dy, so that the quality of the sine wave signal with respect to the y direction can be increased.

The two x-directional photodetectors 57a and 57b in FIG. 22 or FIG. 25 can be substituted by a two-beam photodiode (PD), for example. The two y-directional photodetectors 58a and 58b can also be substituted by a two-beam photodiode (PD). The three x-directional photodetectors 57a–57c in FIG. 27 can be substituted by a three-beam photodiode (PD), for example. The four x-directional photodetectors 57a–57d in FIG. 29 can be substituted by a four-beam photodiode (PD), for example.

Figure 31B:
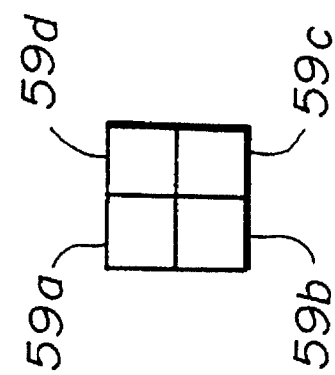
FIGS. 31A and 31B are diagrams showing a different modification of the photodetectors of the encoding apparatus in FIG. 22.
Figure 31A:
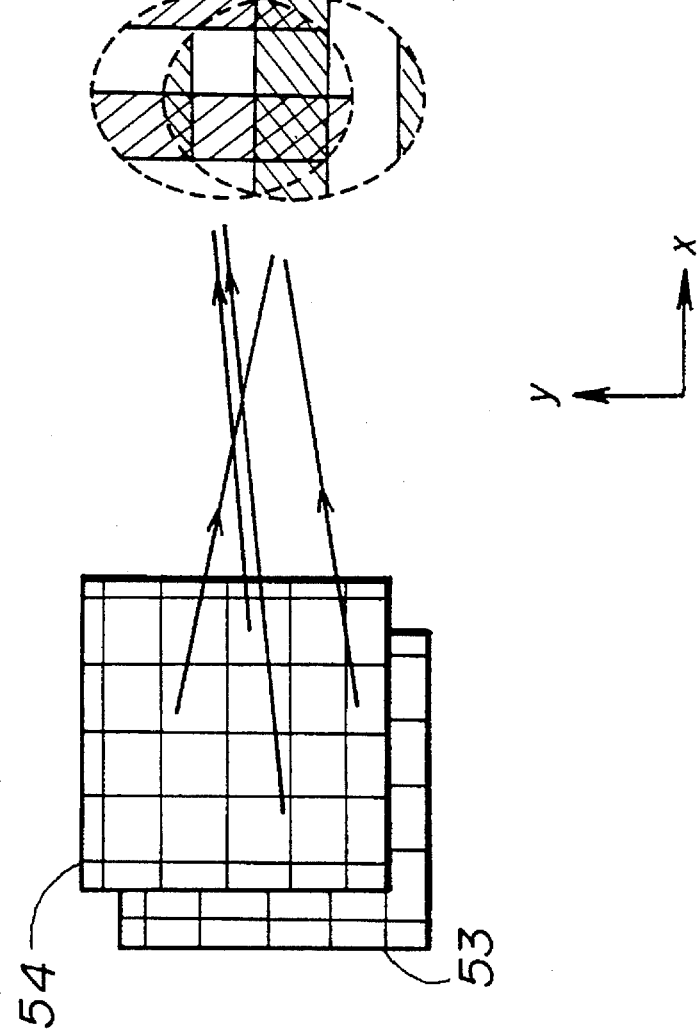

FIGS. 31A and 31B show a different modification of the photodetectors used by the encoding apparatus according to the present invention. In the photodetectors described above, the x-directional photodetectors and the y-directional photodetectors are separately provided. The photodetectors in FIG. 31B include four photodetectors 59a, 59b, 59c and 59d which are arranged in a matrix formation (or in two columns and two rows in the x–y plane), and the x-directional distances of the photodetectors 59a–59d are equal to the y-directional distances thereof. The x-directional photodetectors and the y-directional photodetectors described above can be substituted by the four photodetectors 59a–59d in FIG. 31B. The four photodetectors 59a–59d in FIG. 31B can be used efficiently, especially when the x-directional interference fringes and the y-directional interference fringes overlap each other, as shown in FIG. 31A.

In the encoding apparatus including the photodetectors shown in FIG. 31B, the photodetectors 59a through 59d respectively output the sine wave signals Ax through Dx. In this encoding apparatus, the x-directional relative movement of the diffraction grating with the x–y plane can be measured by obtaining, for example, the value of (Ax+Bx)–(Cx+Dx) from the output signals of the four photodetectors, and the y-directional relative movement of the diffraction grating can be measured by obtaining, for example, the value of (Ax+Dx)–(Bx+Cx) from the output signals of the four photodetectors. Alternatively, the x-directional relative movement can be measured by obtaining the value of either (Ax–Dx) or (Bx–Cx), and the y-directional relative movement can be measured by obtaining the value of either (Ax–Bx) or (Dx–Cx).

In addition, the four photodetectors shown in FIG. 31B can be substituted by a combination of two pieces of two-beam photodiodes. Similarly, nine or more photodetectors arranged in a matrix formation (or in columns and rows) can be substituted by a combination of a plurality of two-beam photodiodes.

Further, the present invention is not limited to the above described embodiments, and several variations and modifications may be made without departing from the scope of the present invention.

What is claimed is:

1. An encoding apparatus for making measurements of a two-dimensional displacement of an object comprising:

a light source;

diffraction grating means for producing first diffracted light rays and second diffracted light rays in response to light emitted from the light source, said diffraction grating means including a number of fine grating portions orthogonally arranged in columns and rows on a diffraction grating surface, said columns and rows of said grating portions being respectively parallel to a first coordinate axis and a second coordinate axis, said first and second coordinate axes being perpendicular to each other, each of the first diffracted light rays having a direction cosine with respect to said first coordinate axis, and each of the second diffracted light rays having a direction cosine with respect to said second coordinate axis;

interference means for producing a first interference light ray by subjecting two diffracted light rays of said first diffracted light rays, supplied from said diffraction grating means, to light interference, and for producing a second interference light ray by subjecting two diffracted light rays of said second diffracted light rays, supplied from said diffraction grating means, to light interference;

first detection means for detecting a phase change of the first interference light ray from the interference means with respect to a direction parallel to said first coordinate axis, so that a movement of an object fixed to the diffraction grating means relative to the light source in said direction is measured based on said phase change; and second detection means for detecting a phase change of the second interference light from the interference means with respect to a direction parallel to said second coordinate axis, so that a movement of the object relative to the light source in said direction is measured based on said phase change, wherein said first and second detection means detect the phase changes of the first and second interference light rays, respectively, simultaneously.

2. An encoding apparatus according to claim 1, wherein said interference means comprises a pair of first mirrors and a pair of second mirrors, said first mirrors reflecting two diffracted light rays of said first diffracted light rays back to said diffraction grating means and subjecting said two diffracted light rays to light interference at said diffraction grating means, and said second mirrors reflecting two diffracted light rays of said second diffracted light rays back to said diffraction grating means and subjecting said two diffracted light rays to light interference at said diffraction grating means.

3. An encoding apparatus according to claim 2, wherein said two diffracted light rays reflected back from said first mirrors and said two diffracted light rays reflected back from said second mirrors enter said diffraction grating means at a single position that is the same as a position at which the light emitted from the light source enters the diffraction grating means.

4. An encoding apparatus according to claim 3, wherein said first interference light ray enters said first detection means at a first diffraction angle to an incident light direction, and said second interference light ray enters said second detection means at a second diffraction angle to said incident light direction, said first diffraction angle being greater than a given first angle and said second diffraction angle being greater than a given second angle.

5. An encoding apparatus according to claim 1, wherein said interference means is a diffraction grating unit different from said diffraction grating means, said diffraction grating unit having a number of fine grating portions orthogonally arranged in columns and rows in a diffraction grating surface adjacent to said diffraction grating means, and said diffraction grating unit having a reflection layer on the diffraction grating surface.

6. An encoding apparatus according to claim 1, wherein said interference means is a diffraction grating unit different from said diffraction grating means, said diffraction grating unit having a number of fine grating portions orthogonally arranged in columns and rows in a diffraction grating surface adjacent to said diffraction grating means, and said diffraction grating unit having a reflection layer on a flat surface opposite to the diffraction grating surface.

7. An encoding apparatus according to claim 1, wherein said interference means comprises a first mirror and a second mirror, said first mirror subjecting said two diffracted light rays of said first diffracted light rays from said diffraction grating means to light interference at said first detection means, and said second mirror subjecting said two diffracted light rays of said second diffracted light rays from said diffraction grating means to light interference at said second detection means.

8. An encoding apparatus for making measurements of a two-dimensional displacement of an object, comprising:

a light source;

a plurality of diffraction grating means each of which includes a number of fine grating portions orthogonally arranged in columns and rows on a diffraction grating surface, said columns and rows of said grating portions being respectively parallel to a first coordinate axis and a second coordinate axis, said first and second coordinate axes being perpendicular to each other, and each of which has grating pitches in two mutually orthogonal directions on the diffraction grating surface, said plurality of diffraction grating means being arranged in parallel to each other, said plurality of diffraction grating means including at least first diffraction grating means for producing first-occurrence, n-th order diffracted light rays of four diffraction directions in response to light emitted from the light source, and second diffraction grating means for producing second-occurrence, m-th order diffracted light rays of four diffraction directions in response to said first-occurrence, n-th order diffracted light rays from said first diffraction grating means;

reflection means for reflecting two diffracted light rays of said second-occurrence, m-th order diffracted light rays, supplied from said plurality of diffraction grating means, back to at least said first diffraction grating means, subjecting said two reflected light rays to light diffraction again by said first diffraction grating means to produce two sets of final-occurrence diffracted light rays with respect to said two mutually orthogonal directions, and for producing first and second interference light rays by interference between one of the two sets of final-occurrence diffracted light rays from said first diffraction grating means and by interference between the other set of final-occurrence diffracted light rays; and detection means for simultaneously detecting a phase change of each of the first and second interference light rays, supplied from the first diffraction grating means by means of said reflection means, with respect to each of directions parallel to said first and second coordinate axes, so that a two-dimensional displacement of an object, fixed to at least one of the plurality of diffraction grating means, relative to the light source is measured based on said phase change of each of the first and second interference light rays.

9. An encoding apparatus according to claim 8, wherein said reflection means reflects two diffracted light rays of said second-occurrence, m-th order diffracted light rays, supplied from said plurality of diffraction grating means, back to said second diffraction grating means and to said first diffraction grating means, and subjects said two reflected light rays to light diffraction again by said first and second diffraction grating means to produce two sets of final-occurrence diffracted light rays with respect to said two mutually orthogonal directions.

10. An encoding apparatus according to claim 8, wherein said reflection means reflects two diffracted light rays of said second-occurrence, m-th order diffracted light rays, supplied from said plurality of diffraction grating means, back to only said first diffraction grating means, and subjects said two reflected light rays to light diffraction again by said first diffraction grating means to produce two sets of final-occurrence diffracted light rays with respect to said two mutually orthogonal directions.

11. An encoding apparatus according to claim 9, wherein said reflection means is a reflection unit separate from said plurality of diffraction grating means.

12. An encoding apparatus according to claim 10, wherein said reflection means is a reflective metal layer formed on a diffraction grating surface of said second diffraction grating means.

13. An encoding apparatus according to claim 8, wherein said plurality of diffraction grating means further comprises third diffraction grating means for producing third-occurrence, k-th order diffracted light rays of four diffraction directions in response to said second-occurrence, m-th order diffracted light rays from said second diffraction grating means.

14. An encoding apparatus according to claim 13, wherein said reflection means reflects two diffracted light rays of said third-occurrence, k-th order diffracted light rays, supplied from said plurality of diffraction grating means, back to said third diffraction grating means, said second diffraction grating means and said first diffraction grating means, and subjects said two reflected light rays to light diffraction again by said first through third diffraction grating means to produce two sets of final-occurrence diffracted light rays with respect to said two mutually orthogonal directions.

15. An encoding apparatus according to claim 13, wherein said reflection means reflects two diffracted light rays of said third-occurrence, k-th order diffracted light rays, supplied from said plurality of diffraction grating means, back to said second diffraction grating means and to said first diffraction grating means, and subjects said two reflected light rays to light diffraction again by said first and second diffraction grating means to produce two sets of final-occurrence diffracted light rays with respect to said two mutually orthogonal directions.

16. An encoding apparatus according to claim 14, wherein said reflection means is a reflection unit separate from said plurality of diffraction grating means.

17. An encoding apparatus according to claim 15, wherein said reflection means is a reflective metal layer formed on a diffraction grating surface of said third diffraction grating means.

18. An encoding apparatus according to claim 8, wherein said detection means comprises four photodetectors, said photodetectors being arranged by equal distances equivalent to a quarter of one pitch of interference fringes on said detection means, and a first difference signal being produced from first and third signals output from two of said photodetectors and a second difference signal being produced from second and fourth signals output from the other photodetectors.

19. An encoding apparatus according to claim 8, wherein said detection means comprises first through third photodetectors, said three photodetectors being arranged by equal distances equivalent to a quarter of one pitch of interference fringes on said detection means, and a first difference signal being produced from first and second signals output from said first and second photodetectors and a second difference signal being produced from second and third signals output from said second and third photodetectors.

20. An encoding apparatus for making measurements of a two-dimensional displacement of an object, comprising:

a light source;

first diffraction grating means for producing first-occurrence, n-th order diffracted light rays of four diffraction directions in response to light emitted from the light source, said first diffraction grating means including a number of fine grating portions orthogonally arranged in columns and rows on a diffraction grating surface, said columns and rows of said grating portions being respectively parallel to a first coordinate axis and a second coordinate axis, said first and second coordinate axes being perpendicular to each other, said first diffraction grating means having two first grating pitches in two mutually orthogonal directions perpendicular to the diffraction grating surface;

second diffraction grating means for producing second-occurrence, m-th order diffracted light rays of four diffraction directions in response to said first-occurrence, n-th order diffracted light rays from said first diffraction grating means, said second diffraction grating means being arranged in parallel to said first diffraction grating means, said second diffraction grating means including a number of fine grating portions orthogonally arranged in columns and rows on a diffraction grating surface, said columns and rows of said grating portions being respectively parallel to the first coordinate axis and the second coordinate axis, said second diffraction grating means having two second grating pitches in two mutually orthogonal directions perpendicular to the diffraction grating surface; and detection means for simultaneously detecting a two-dimensional phase change of interference light rays with respect to directions parallel to the first and second coordinate axes, said interference light rays being produced by interference between at least two diffracted light rays of said second-occurrence, m-th order diffracted light rays supplied from said second diffraction grating means, so that a two-dimensional displacement of an object, fixed to at least one of the first diffraction grating means and the second diffraction grating means, is measured based on said two-dimensional phase change.

21. An encoding apparatus according to claim 8, wherein said detection means comprises four photodetectors orthogonally arranged in columns and rows, said columns and rows of said photodetectors being respectively parallel to the first coordinate axis and the second coordinate axis.

22. An encoding apparatus according to claim 20, wherein said detection means comprises four photodetectors orthogonally arranged in columns and rows,, said columns and rows of said photodetectors being respectively parallel to the first coordinate axis and the second coordinate axis.

* * * * *